US006449708B2

(12) United States Patent
Dewhurst et al.

(10) Patent No.: US 6,449,708 B2
(45) Date of Patent: *Sep. 10, 2002

(54) FIELD PROGRAMMABLE PROCESSOR USING DEDICATED ARITHMETIC FIXED FUNCTION PROCESSING ELEMENTS

(75) Inventors: Andrew Dewhurst; Gorden Work, both of Cheshire (GB)

(73) Assignee: Systolix Limited, Warrington (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,906
(22) PCT Filed: Jun. 6, 1997
(86) PCT No.: PCT/GB97/01520
§ 371 (c)(1),
(2), (4) Date: Dec. 4, 1998
(87) PCT Pub. No.: WO97/46948
PCT Pub. Date: Dec. 11, 1997

(30) Foreign Application Priority Data

Jun. 7, 1996 (GB) .............................. 9611994

(51) Int. Cl.[7] .............................. G06F 15/80
(52) U.S. Cl. .......................... 712/16; 712/15
(58) Field of Search .................. 712/10, 11, 15, 712/16

(56) References Cited

U.S. PATENT DOCUMENTS 5,600,845 A * 2/1997 Gilson ........................... 712/39
5,740,463 A * 4/1998 Oshima ....................... 712/11
5,857,109 A * 1/1999 Taylor .......................... 712/37

OTHER PUBLICATIONS

Fijioka et al., "Desing of a reconfigurable parallel processor for digital control using FPGAs", 7/94, pp. 1123–129.*
Chan et al., "Aprogrammable processing system using FPGA", 5/94, pp. 125–128.*
Fijioka et al,"Design of a Reconfigurable parallel Processor For Digital Control Using FPGAS", IEICE Transactions on Electronics, vol. E77–C, No. 7, Jul. 1, 1994, pp. 1123–1129, XP000469953.
Arnold, "This Splash 2 Software Environment", Journal of Supercomputing, vol. 9, No. 3, Jan. 1, 1995, pp. 277–290, XP000589469.
Chan et al, "A Programmable Processing System Using FPGA", International Symposium on Circuits and Systems (iscas), Digital Signal Processing (DSP), London, May 30–Jun. 2, 1994, vol. 2, May 30, 1994, Institute of Electrical and Electronics Engineers, pp. 125–128.

* cited by examiner

Primary Examiner—John F. Niebling
Assistant Examiner—Stacy A Whitmore
(74) Attorney, Agent, or Firm—Nixon & Vanderhye P.C.

(57) ABSTRACT

A field programmable processor includes a regular array of processing elements, each of which is adapted to perform a fixed arithmetic function on packets of data. The processing elements are interconnected by an array of signal conductors extending adjacent the processing elements. Switching means are provided for selectively connecting the processing elements to the adjacent signal conductors so as to interconnect the processing elements. Program data representing desired processing element interconnections is stored, the switches are controlled in accordance with the stored program data to achieve the desired processing element interconnections. The packets of data are transmitted between the interconnected processing elements.

19 Claims, 25 Drawing Sheets

FIELD PROGRAMMABLE PROCESSOR USING DEDICATED ARITHMETIC FIXED FUNCTION PROCESSING ELEMENTS

BACKGROUND OF THE INVENTION

I. Field of the Invention

The present invention relates to a field programmable processor and more particularly to such a processor capable of emulating analogue functions.

II. Related Art

In recent years there has been a widespread move in the microelectronics industry away from 'Custom' or 'Semi-custom' integrated circuits whose function is determined during manufacture towards Field Programmable components whose function is determined not when the integrated circuit is fabricated, but by an end user, 'in the field', prior to use.

Field Programmable Gate Arrays (FPGAs) are now widely used to implement many digital functions and offer the advantages of low non-recurring engineering costs, fast turnaround (designs can be placed and routed on an FPGA in typically a few minutes), and low risk since designs can be easily amended late on in the product design cycle. It is only for high volume production runs that there is a cost benefit in using the more traditional approaches.

However, there is no adequate equivalent to FPGAs for implementing analogue circuitry.

The concept of Field Programmable Analogue Arrays is known. Hans Klein in "The EPAC Architecture: An Expert Cell Approach to Field Programmable Analogue Arrays" (proceedings of ACM FPGA '96 Conference, February 1996) describes a device which can implement a limited set of programmable filter functions and gain stages. However, this does not offer the user any degree of design freedom in that all filters are pre-designed and the user only selects the filter which best matches his requirements.

A. Bratt and I. Macbeth describe in "Design and Implementation of a Field Programmable Analogue Array" (proceedings of ACM FPGA '96 Conference, February 1996) an array of programmable cells. Each cell contains an operational amplifier (OPAMP), multiple programmable capacitors, and switching arrangements for connecting the capacitors in such as a way as to perform the desired function. As it is difficult to manufacture accurately and reliably absolute capacitor and resistor values in typical silicon chip fabrication, a technique known as 'switched capacitor filter design' has been developed and is described in "Analog MOS Integrated Circuits"—R. Gregorian, G. C. Temes, published by John Wiley & Sons, Inc., 1986. In this technique, reliable filter specification is achieved by a ratio of capacitors and an accurate control of the frequency of a 'sampling' clock. This technique provides programming flexibility but there are still substantial disadvantages in using a device manufactured in this way.

First, owing to parasitics and imperfections in the fabrication process there is a minimum size of capacitor which can be made reliably. To provide a reasonable frequency response and programming range, the capacitors must be constructed that are many times greater than this minimum size ( say 256 time greater) and hence large areas of silicon are required thereby increasing the cost. In addition, operational amplifiers require relatively large areas of silicon in comparison to logic circuitry.

Secondly, the above measures to combat parasitics only reduce the extent of and do not eliminate the problem. For example, a practical OPAMP implementation may experience a variable +/−10 mV input differential offset between successive production runs of silicon, due to variations in transistor characteristics. Analogue circuit design is sensitive to OPAMP voltage offsets of this magnitude and in many cases it is not possible for a user to 'design around' this unknown quantity. In conventional analogue electronics design it is usual to provide extra pins on the OPAMP integrated circuit for the user to adjust the offset manually to zero by use of a potentiometer in those parts of the circuitry which are sensitive to these type of offsets. This is clearly not practical on an field programmable analogue array which may have 10 or 20 OPAMP elements.

Thirdly, end users require accurate simulation models to determine, with precision, behavior of the programmed circuits. The simulation models are generally complex in view of the non-ideal performance of an operational amplifier caused by well known factors such as voltage offsets, parasitic "poles", finite gain-bandwidth product etc. Without detailed simulation tools it is possible for the same design to behave quite differently under different conditions.

Finally, the end user requires a relative high understanding of analogue design techniques to use a field programmable analogue array of this type.

It is known for digital signal processing devices to have an array of processing elements. Each processing element performs an operation on a piece of data and then passes the result forward to another element for a further operation to be carried out, possibly in combination with data output from other elements. A description of a such a processor array is given in Mead, C., Conway, 1., "Introduction to VLSI systems", published by Addison-Wesley, Reading, Mass., 1980 (pages 271 to 279). The connections between the processing elements of the array are fixed. These arrays are usually synchronous, i.e. input data is clocked in on one system clock pulse and the result out on the next clock pulse.

SUMMARY OF THE INVENTION

It is an object of the present invention to obviate or mitigate the aforesaid disadvantages and to provide a programmable processor capable of performing signal processing and arithmetic functions needed to emulate linear and non-linear analogue functions.

According to the present invention there is provided a field programmable processor comprising a regular array of processing elements each of which is adapted to perform a fixed function on packets of data, an array of signal conductors extending adjacent the processing elements, switching means for selectively connecting the processing elements to the adjacent signal conductors so as to interconnect the processing elements, means for storing program data representing desired processing element interconnections, means for controlling the switching means in accordance with the stored program data to achieve the desired processing element interconnections, means for storing numeric data values within each processing element, and means for synchronously transmitting packets of serial data between the interconnected processing elements.

The term "fixed function" is intended to cover at least a static arithmetic function whereby a processing element performs a dedicated arithmetic function once the processor has been defined and programmed. This does not discount the possibility of the processor being reprogrammed at a later time.

Conveniently there may be provided a further array of signal conductors extending adjacent the processing elements, the further array being arranged to convey function control data between the processing elements.

The function control data may generated by a processing element or a combination of processing elements. Preferably the function controlled by the function control data is any one of reset, set, enable or modification of the signal data.

The packets of data are conveniently synchronously transmitted between processor elements in serial form.

The fixed function of each processing element is preferably either multiply or add.

Preferably at least one processing element having the multiply function uses a shift and add operation. This enables processing of a received packet to be initiated before all the bits of that packet have arrived.

The processing elements may be arranged in an array of identical groups of elements, each group incorporating processing elements of different functions. Each identical group may comprise one processing element with the add function and three processing elements having the multiply function.

Preferably the processor element has delay means so that data on an output of the processing element is a copy of the input data delayed by the time it takes to transmit a complete packet of data.

Preferably there is provided means to transmit control data between the further array of signal conductors and an external control data source or destination.

Means may be provided for converting the stored numeric data value into serial format so that it may be used in the processing element.

Preferably said data packets contain control flags.

Preferably the data packets contain bits of control data and data packets passed between processing elements may include control flags indicating errors resulting from arithmetic operations in the processing element from which data is transmitted, means being provided for correcting errors in data received by at least some of the processing elements.

The processing elements may perform arithmetic operations using fixed point processes, and the errors indicated by the control data may be positive and/or negative overflow. Multiplier processing elements may be provided which incorporate means for handling locally generated errors.

In a preferred embodiment there are provided analogue to digital and digital to analogue converters connected to the signal conductors to enable digital conversions of input analogue signals to be delivered to the processing elements and to enable the output of analogue conventions of digital signals produced by the processing elements.

According to a second aspect of the present invention there is provided a field programmable processor comprising a regular array of processing elements, an array of signal conductors extending adjacent the elements, switching means for selectively connecting the elements to the adjacent signal conductors so as to interconnect the elements, means for storing program data representing desired element interconnections, means for controlling the switching means in accordance with the stored program data to achieve the desired processing element interconnections, means for transmitting packets of data between the interconnected elements, and means for handling errors appearing in the output of one element in a subsequent element.

BRIEF DESCRIPTION OF THE DRAWINGS

A specific embodiment of the present invention will now be described, by way of example only, with reference to the accompanying drawings in which.

DETAILED DESCRIPTION OF EXEMPLARY EMBODIMENTS

Figure 1:
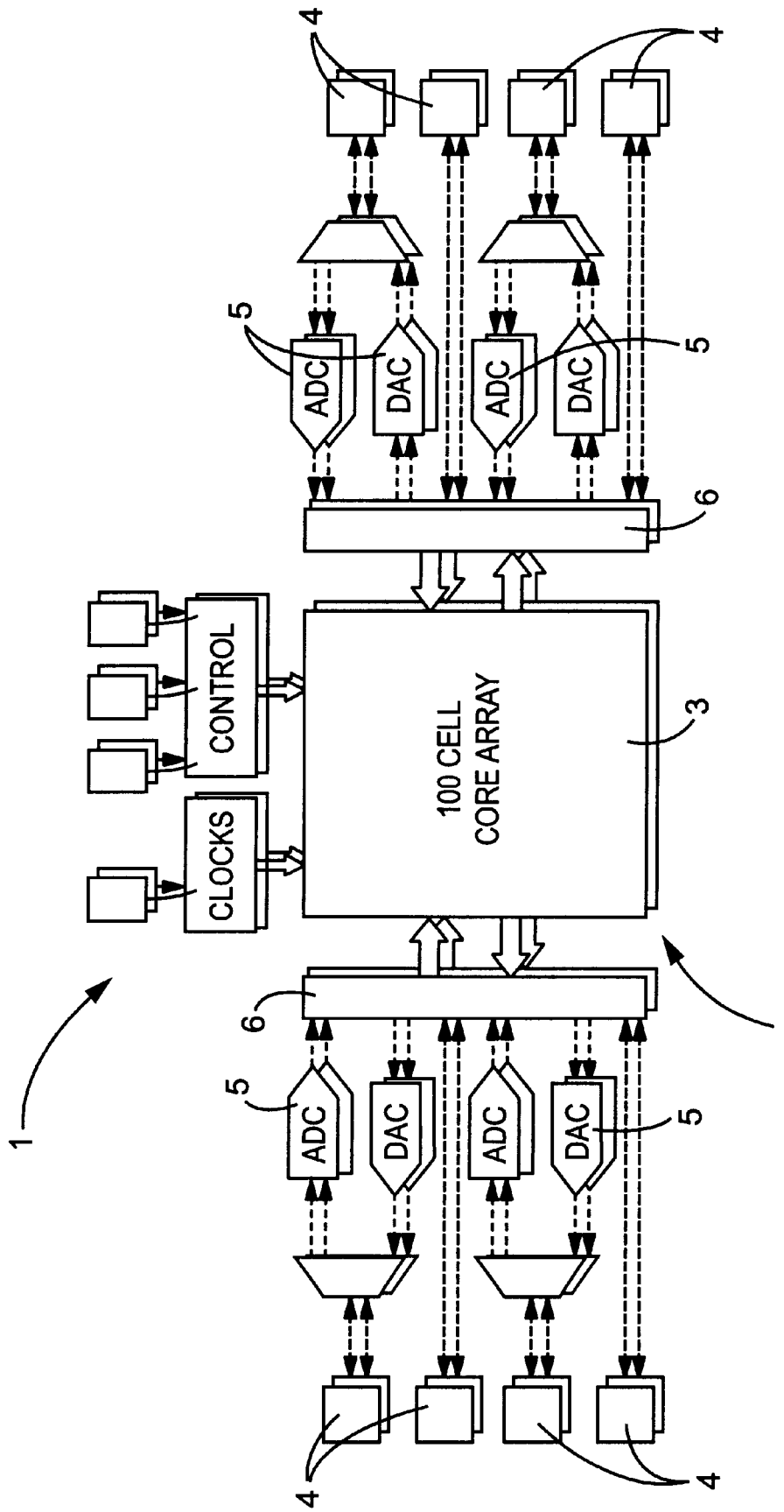
FIG. 1 is a schematic block diagram of the architecture of an analogue programmable unit including a field programmable processor of the present invention.

Referring now to the drawings, FIG. 1 shows an analogue programmable array 1 incorporating a field programmable processor 2 of the present invention. The processor 2 comprises a core array 3 of 100 programmable cells that will be described later. The programmable array 1 has eight data ports 4 (four analogue, four digital) that are each programmable in direction. Analogue to digital and digital to analogue converters 5 are provided so that incoming analogue signals may be processed digitally and the result output in analogue form. Each converter 5 has typically ten bit precision and a conversion rate of 60 MS/s.

The core array 3 is connected to the ports 4 via an array interface 6 that provides bi-directional bit serial data and control signal connections between the core array 3 and the ports 4. The array interface 6 processes data in bit-serial format and, if necessary, a serial-to-parallel converter may be provided for parallel data communication.

The core array 3 has a control unit 7 containing programming logic and control logic to interface with an external programming system and a clock 8. Timing signals that control all data transfer within the core array 3 are generated by the clock 8 and an associated logic circuit.

Figure 2:
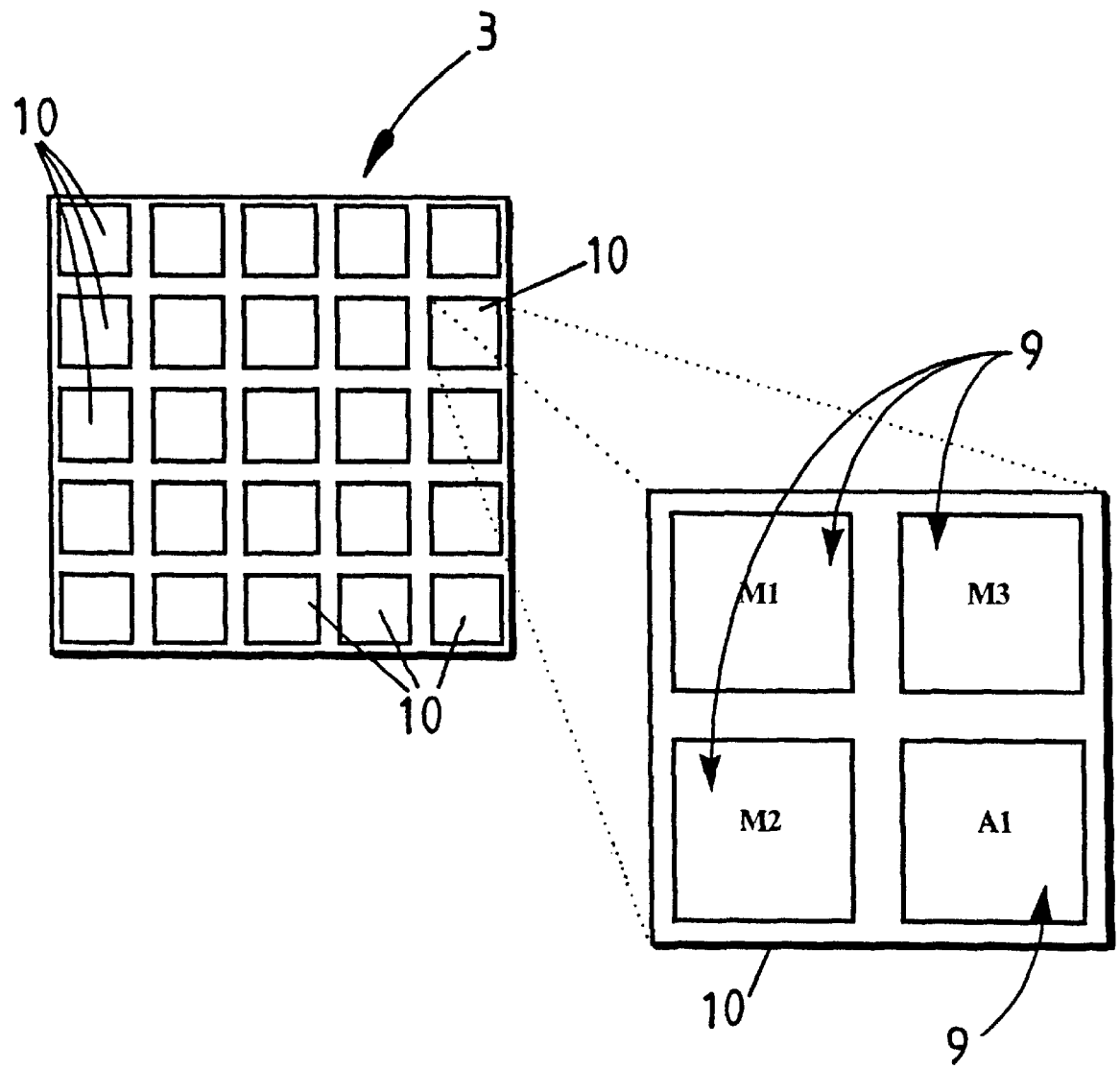
FIG. 2 is a schematic block diagram of the field programmable processor of FIG. 1.

FIG. 2 shows the structure of the core array 3. It comprises an array of processing cells 9 interconnected through a combination of fixed and programmable bit-serial connections (not shown in FIG. 2).

Each processing cell 9 is set up to perform a fixed arithmetic function, either multiplication (in a multiplier cell) or addition (in an accumulator cell). The array processing cells 9 are arranged in groups of four (2×2) indicated by reference numeral 10, with three multiplier cells (M1, M2 & M3) and one accumulator cell (A1) in each group as shown in FIG. 2. The ratio of multiplier M to accumulator processing cells A within each group is chosen to satisfy typical design requirements and may vary depending on the targeted application. The group 10 is the smallest repeatable building block in a core array 3 and contains special direct connections between the cells 9 within it.

Every cell 9 in the core array 3 has inputs that are selectively enabled by multiplexers and that are connected directly to the outputs of neighboring processing cells 9 or to outputs of other cells 9 via a programmable interconnection network. Every processing cell 9 also has an output that is connected to an input multiplexer of near processing cells 9 and is connected to the programmable interconnection network through an output multiplexer. The two methods of programmable connection, direct local connections and the longer distance programmable interconnect network, enable the processing cells 9 to be interconnected as required so that the desired complex functions can be implemented.

There are two such programmable interconnection networks, one for data signals and a second for control signals. The two are entirely independent and do not interact except indirectly within the processing cell 9. These programmable interconnections extend to the boundary of the core array 3 where the array interface 6 provides connections into and out of the core array 3.

Figure 3:
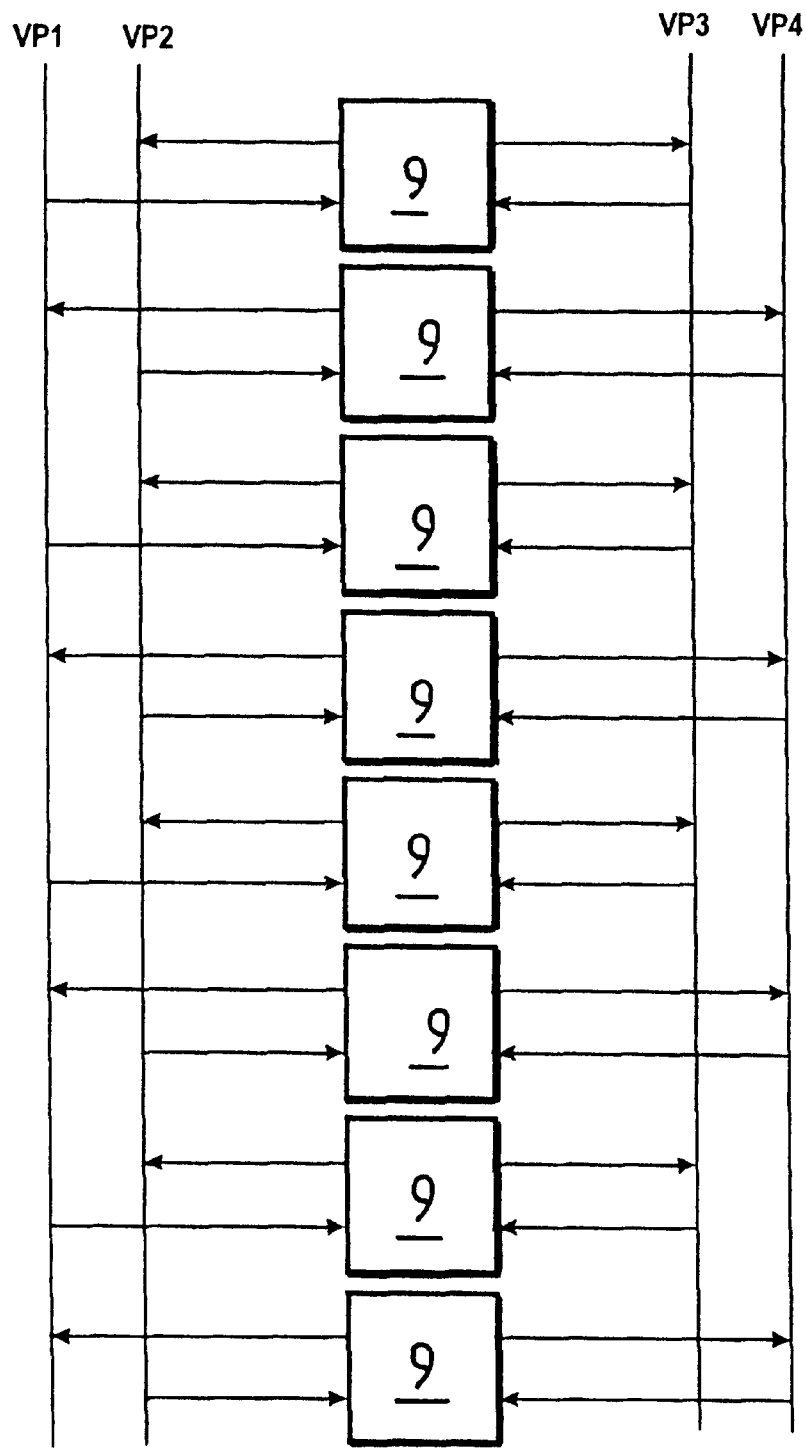
FIGS. 3 to 6 show schematically programmable interconnection networks for the processing elements.
Figure 4:
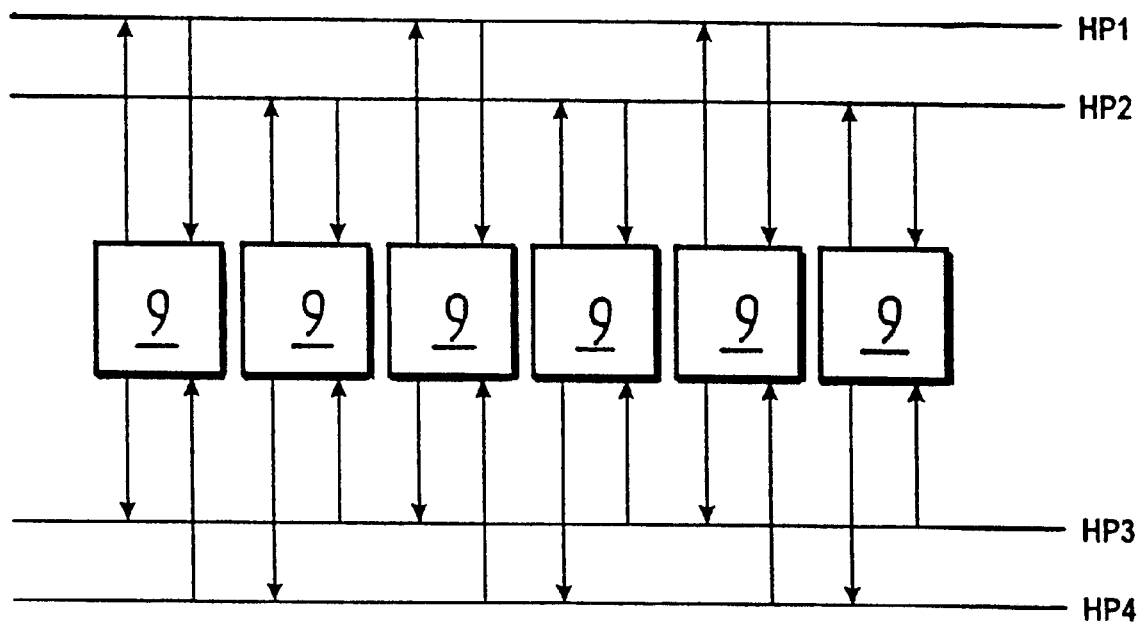

Each programmable interconnection network is bi-directional. In the data signal interconnect network the signals are applied to and from programmable busses VB1–VB4 and HP1–HP4 through multiplexers with tristate outputs. Four connections run over every cell 9, both vertically, as shown in FIG. 3, and horizontally as shown in FIG. 4. The pattern of connections to and from a cell 9 are repeated every second cell.

Figure 5:
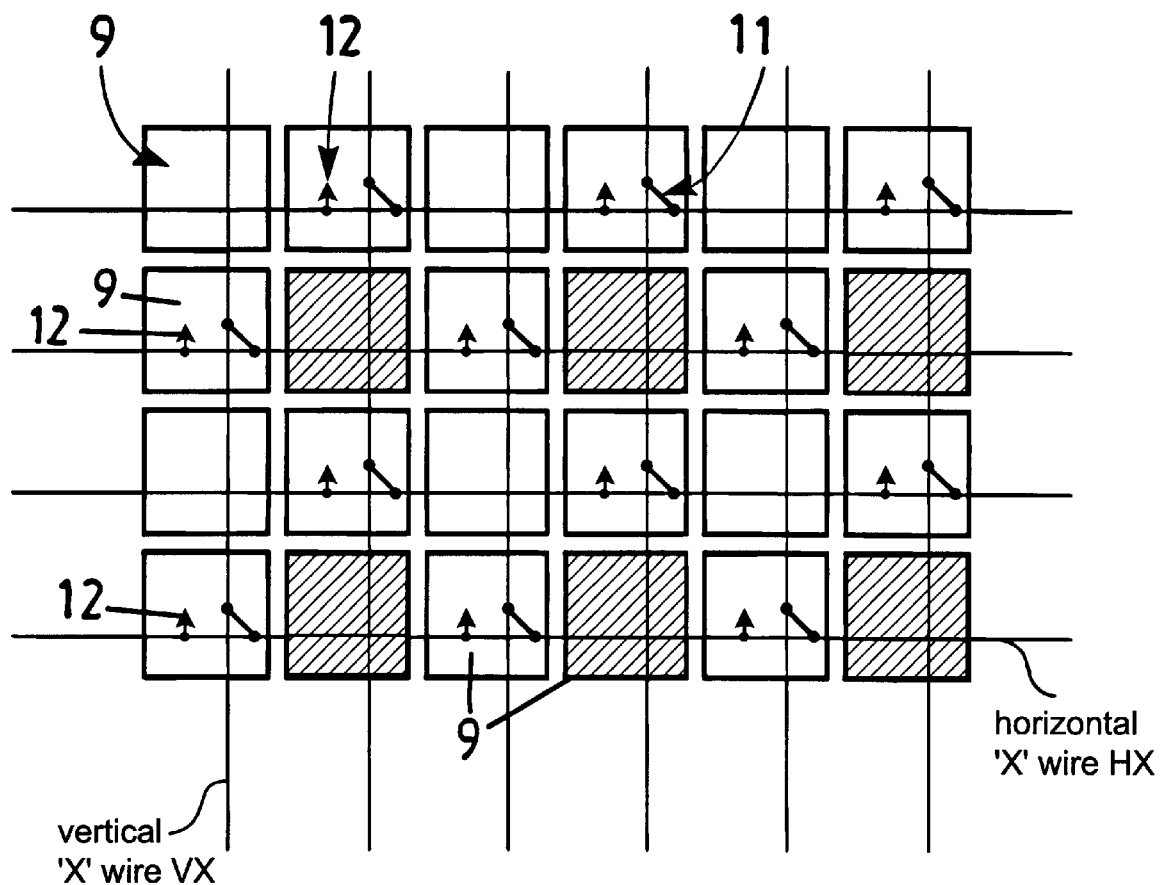

In order to facilitate diagonal or dog-leg connections between cells 9, or between the array interfaces 6 and cells 9, an interconnect network allowing the joining of horizontal and vertical routes is included. A single wire runs over every cell 9 both vertically and horizontally, shown in FIG. 5. Programmable switches 11, capable of joining these wires, are present in certain cells 9 of in the array 3. The horizontal wires connect to and from the interface arrays 6. All cells 9 take their input from the horizontal wire HX and output onto the vertical wire VX. The small arrows 12 shown on the horizontal wires HX in FIG. 5 denote an input from the wire to the cell 9.

Figure 6:
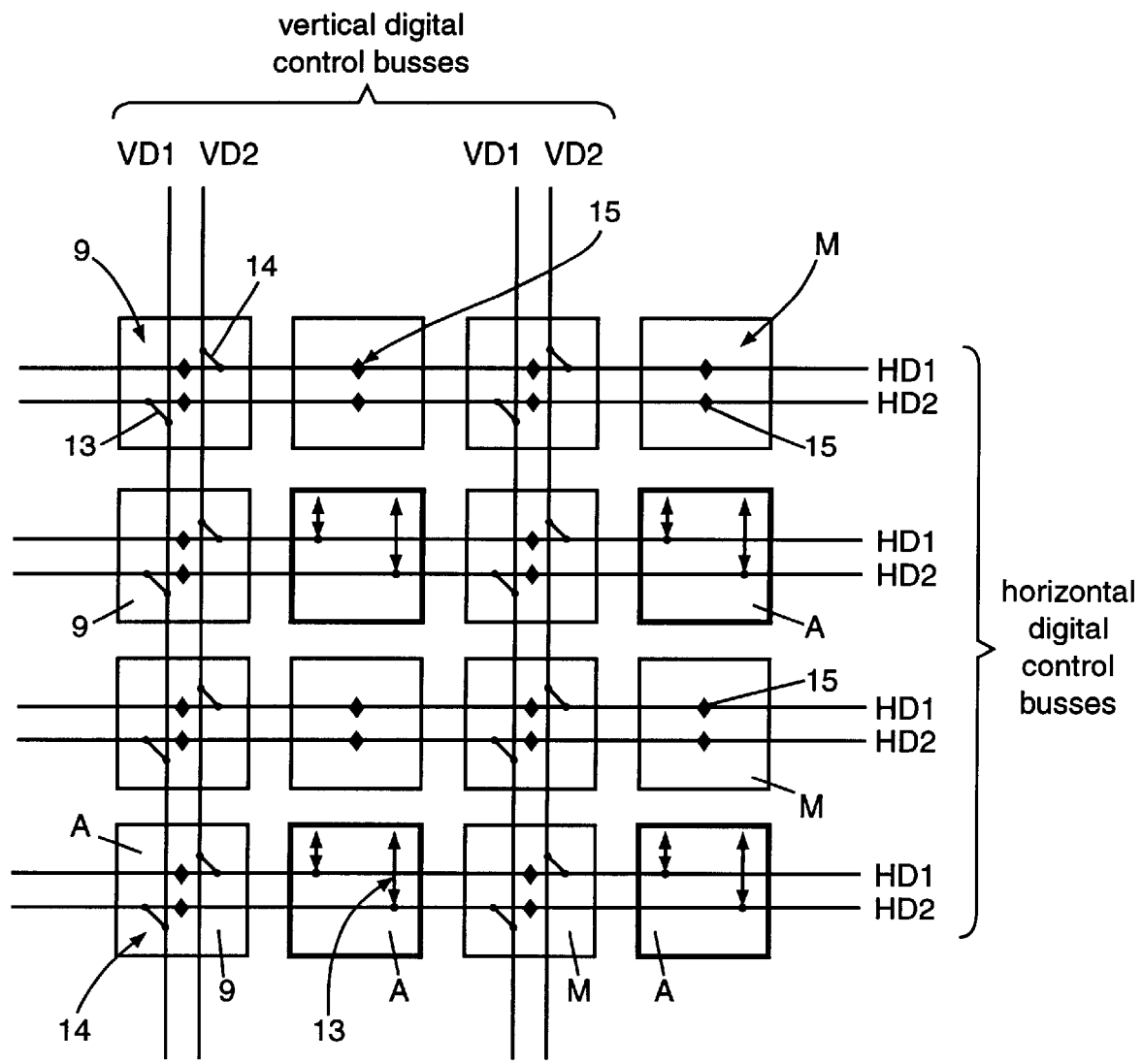

The multiplier cells M receive control signals which may come from an accumulator cell A or from a source external to the core array 3 or a combination of both. Two control signals may be combined through a logical function in the accumulator cell A to generate a new control signal. These control signals are routed through the programmable digital control interconnect network shown in FIG. 6. The network comprises a plurality of horizontal control buses HD2 & HD1 or HD3 & HD4 that run over every cell 9 and which are connected to vertical control buses VD1 & VD2 that run over every other cell 9. Bi-directional connections 13 between cells 9 are always made to and from the horizontal control buses HD whilst the vertical buses VD and programmable switches 14 between horizontal and vertical buses HD,VD allow diagonal and dog-leg routes. The black diamonds 15 shown in FIG. 6 represent an input connection to the cell 9.

Figure 7:
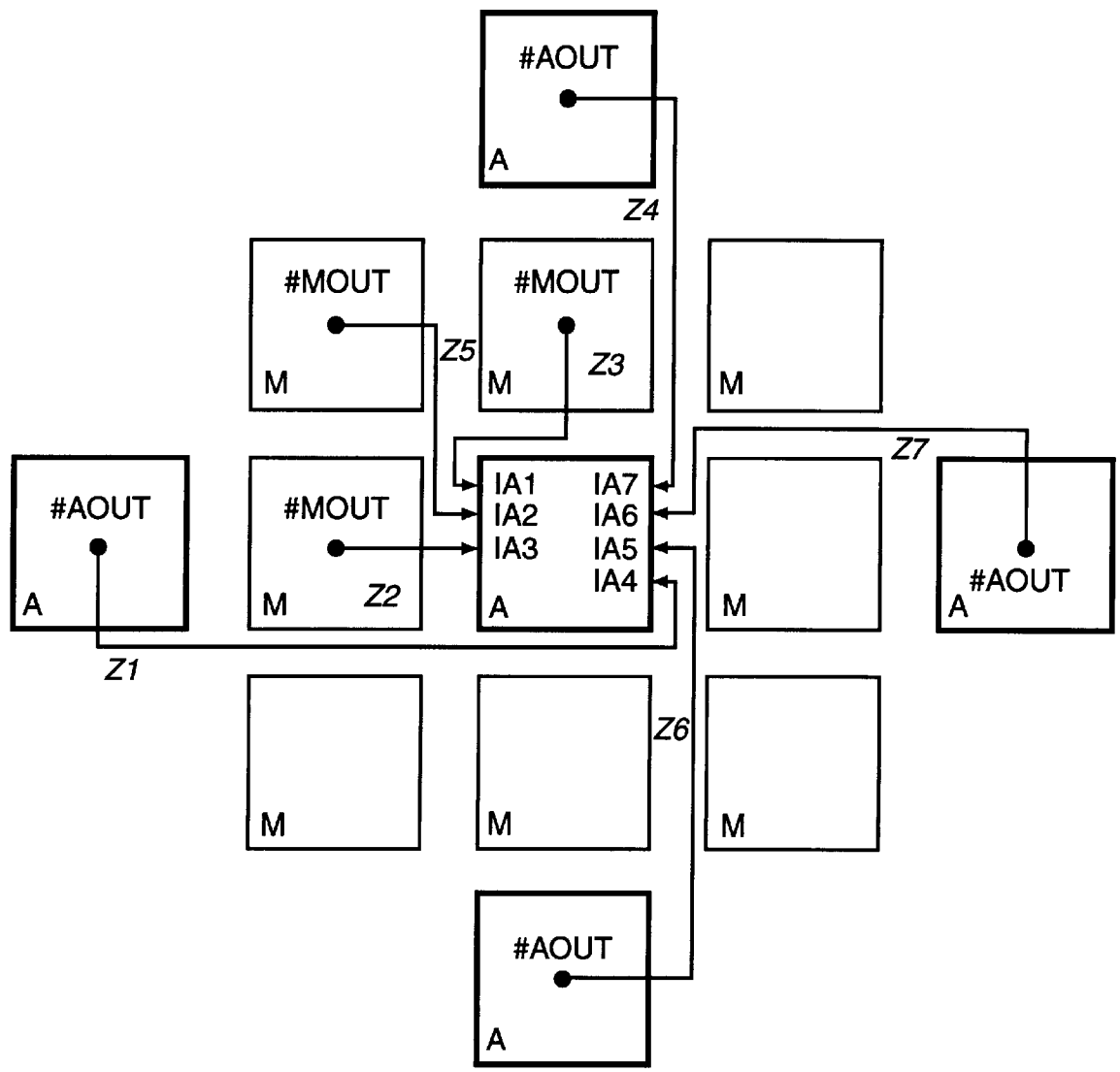
FIGS. 7 to 9 show schematically direct local connections between neighboring processing elements.
Figure 8:
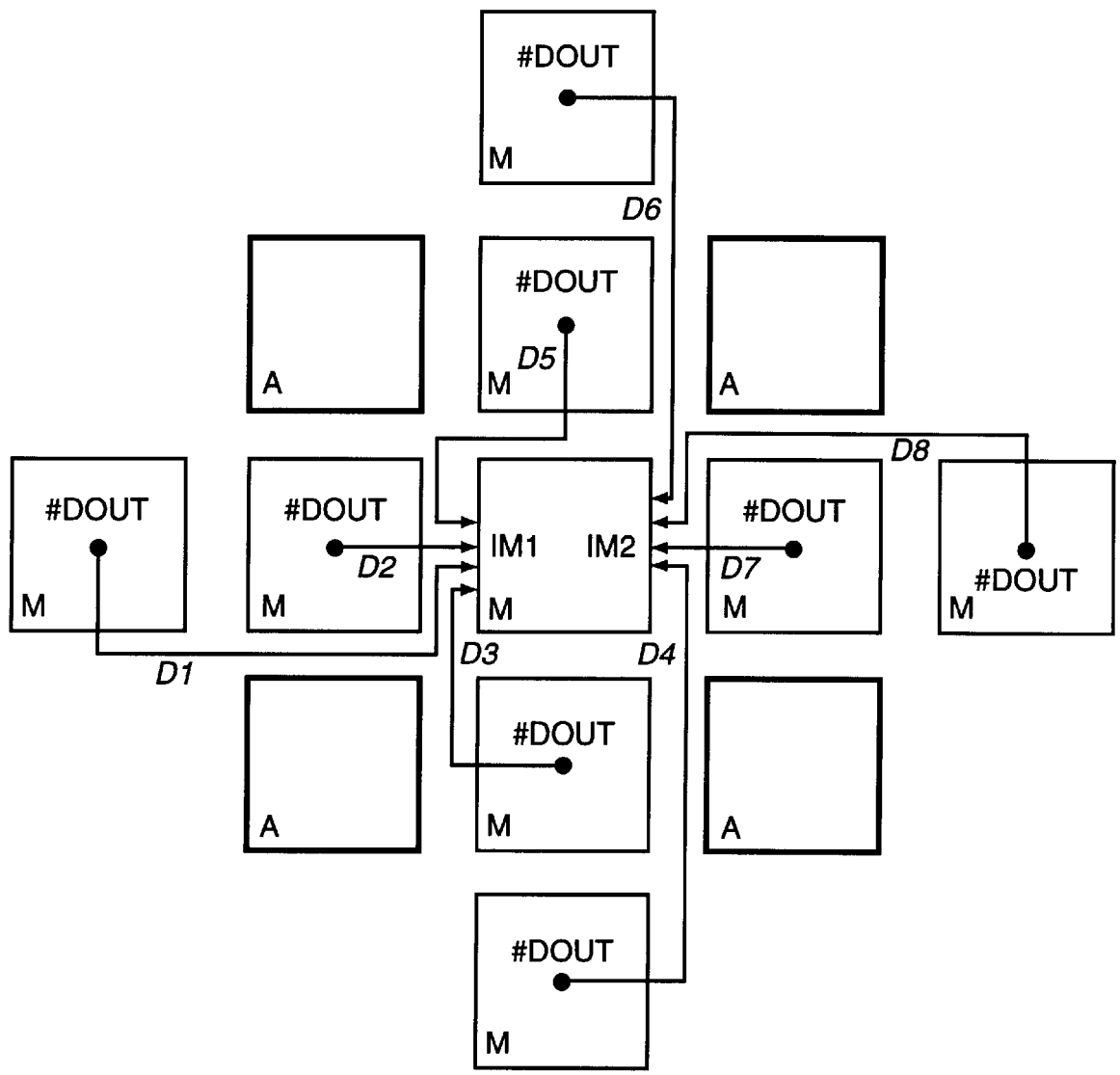
Figure 9:
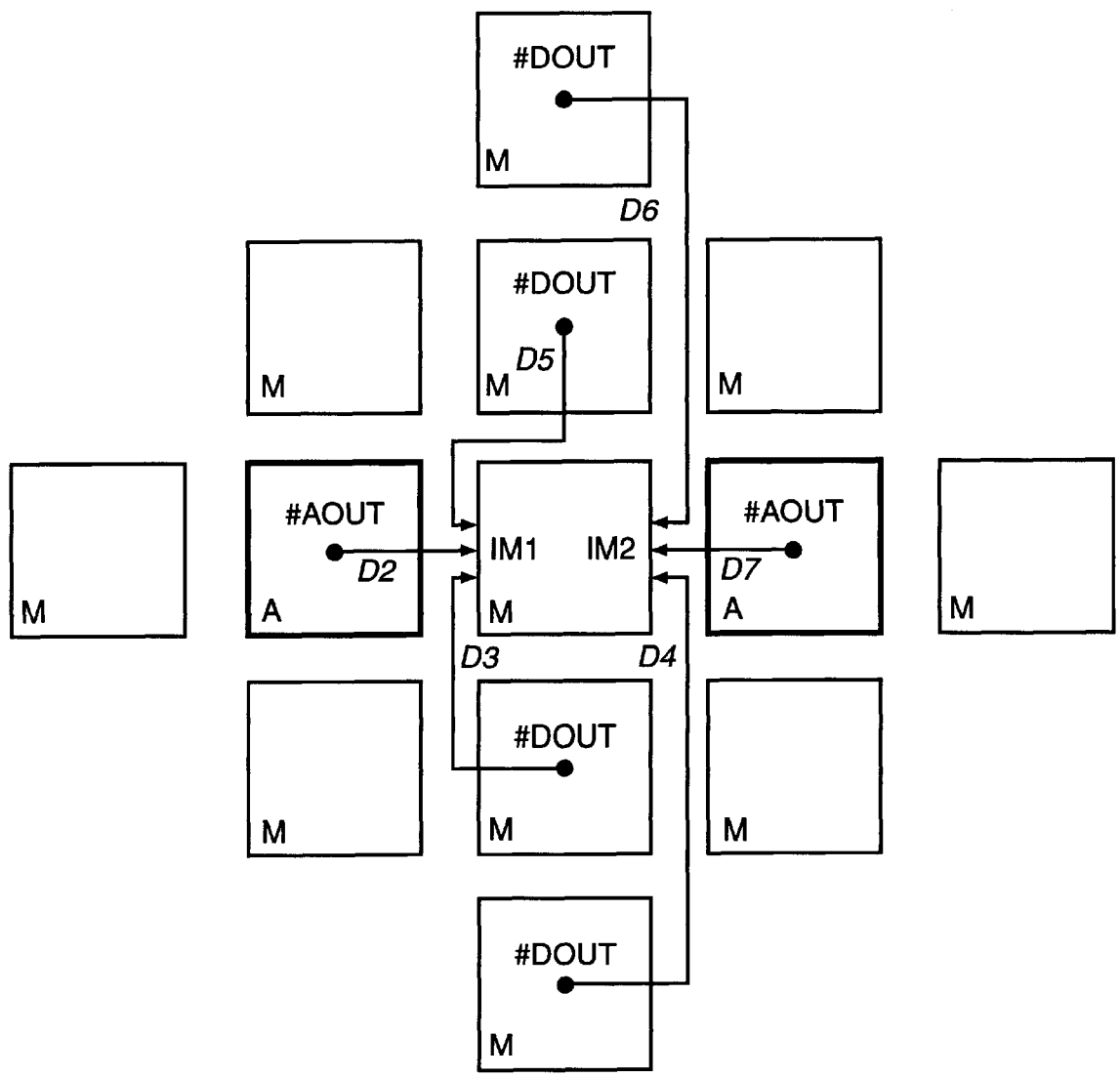

Direct local connection networks are shown in FIGS. 7 to 9. In the arrangement of local multiplier and accumulator cells M,A shown in FIG. 7 each accumulator cell A can receive direct connections from the other cells 9 using the connections Z1-7. This connection arrangement is consistent for all accumulators and allows signals to be fed from multiplier M to accumulator A whilst permitting accumulator cells A to be cascaded. Accumulator cell A outputs are indicated by #AOUT and multiplier cell M outputs by #MOUT.

The direct local connections D1-7 between the multiplier cells M are dependent on the relative position of each cell. Two alternative examples of direct local connection arrangements are shown in FIGS. 8 and 9.

Figure 10:
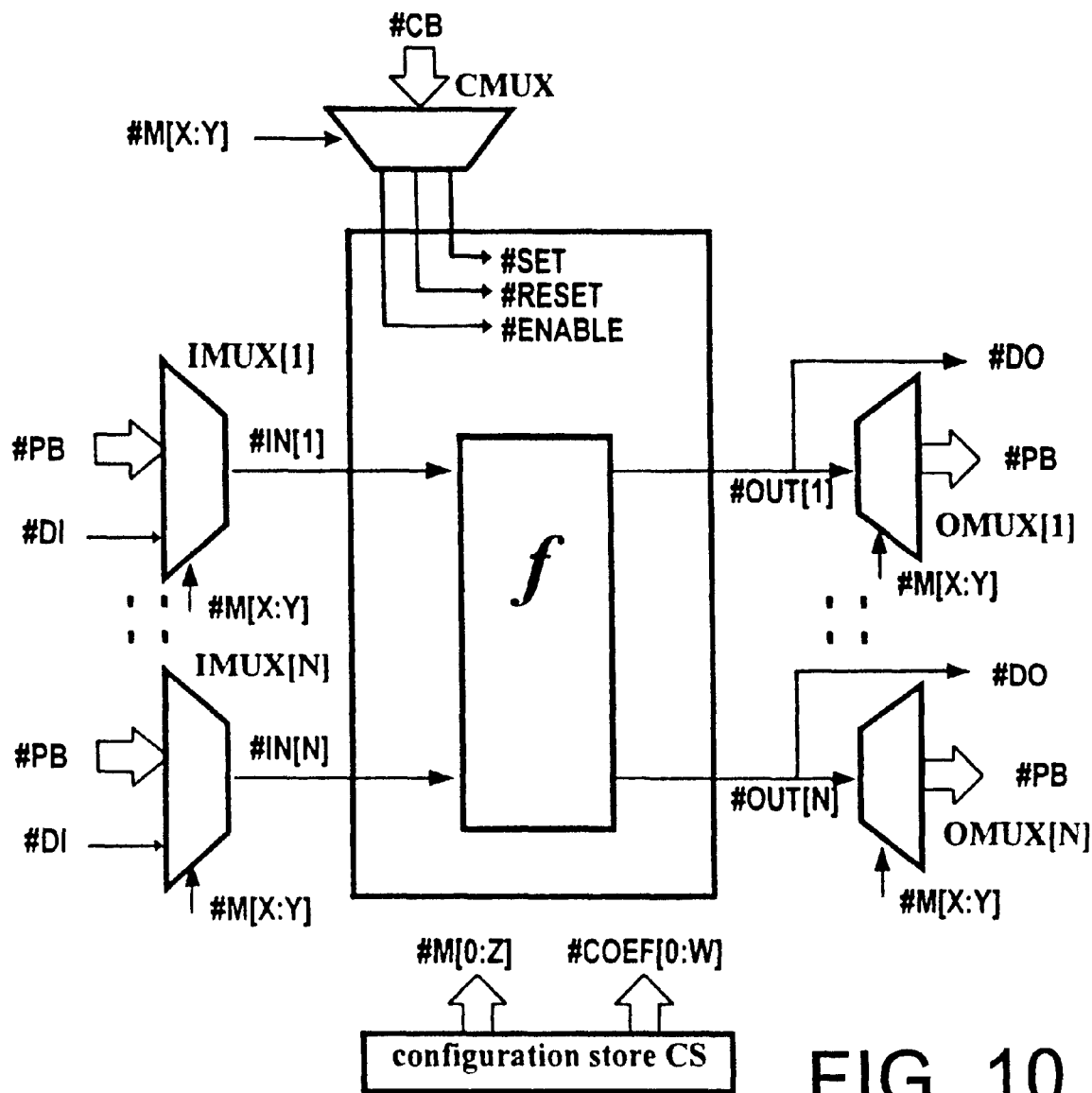
FIG. 10 is a schematic block diagram of the detail of a processing element of the present invention.

All the cells 9 in the core array 3 have a basic structure as shown in FIG. 10. The cell 9 performs a fixed function in the function block $f$, the functions being either multiplication or accumulation. A configuration store CS holds programming data which determines which signals are routed to the cell through input multiplexers IMUX[1:N] and which signals are routed out of the cell through output multiplexers OMUX[1:N]. The configuration store CS also sets coefficients COEF[0:W] and non-linear functions within the cell. Signals on a control bus #CB can be routed into the cell through multiplexer CMUX to override the original programming and to control the operation of the cell based on the state of the system. This enables the implementation of more complex adaptive functions.

Signal data is routed into the cell from the array's data interconnect network, which comprises buses from the programmable interconnection network #PB running over the cell and buses DI#, DO# from the direct local connection network. An input multiplexer IMUX selects the input signals #IN[1:N] to be passed to the function block $f$. The function block $f$ outputs data signals #OUT[1:N] that are routed selectively on to the programmable interconnect network #PD via the output multiplexer OMUX[1:N] and/or directly to other cells using direct local connections #DD.

Figure 11:
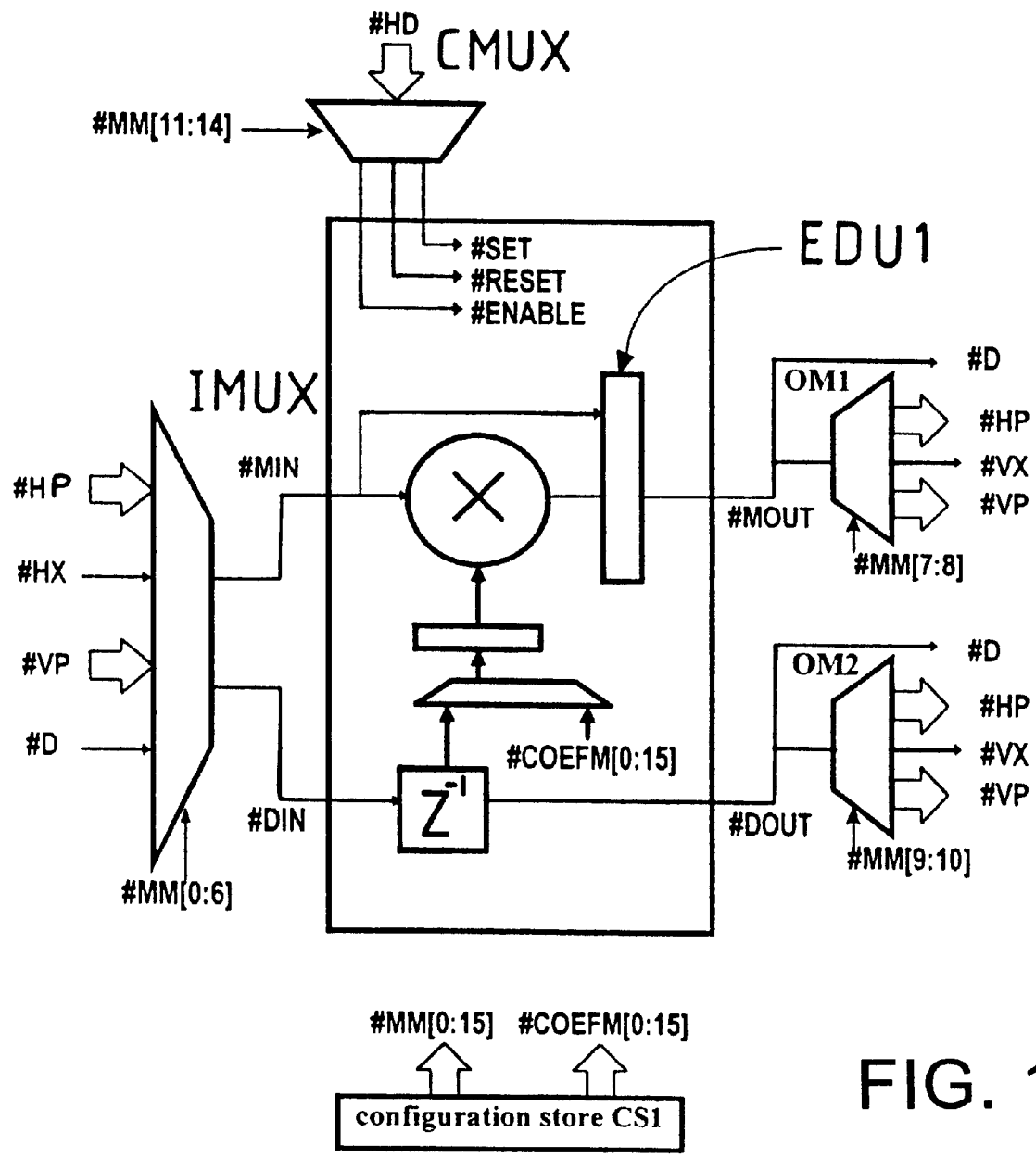
FIG. 11 is a schematic block diagram of a multiplier processing element.

FIG. 11 shows the contents of the function block $f$ for the multiplier cell. The cell principally comprises a multiplier unit X and a delay block $Z^{-1}$ which provide parallel functions on data from several sources. The delay block $Z^{-1}$ delays any data passed to it by one sample period. The data provided to these two functions can be from the same or different sources. Input data to the input multiplexer IMUX is taken selectively from horizontal or vertical busses #HP, #VP of the data programmable interconnect or from the direct local interconnect bus #D. The data representing the result of the processing comprises the result of the multiplication together with the output #MOUT of an error detection unit EDU.

Control data is routed from the control data bus #HD of the programmable interconnect network via a control multiplexer CMUX and allows the operation of the function block $f$ to be controlled externally.

Figure 12:
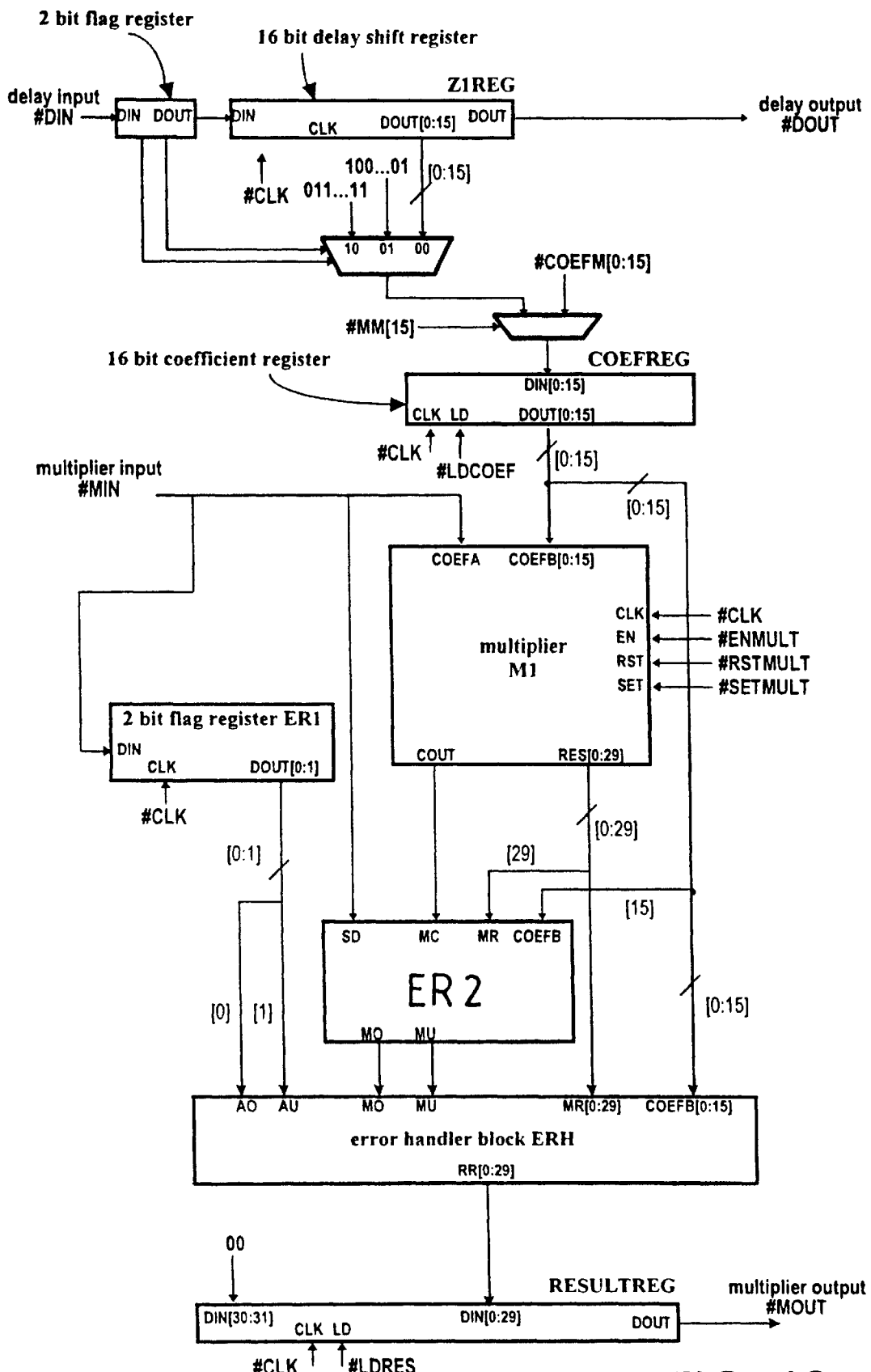
FIG. 12 is a detailed block diagram of the multiplier processing element shown in FIG. 11.

Referring to FIG. 12, incoming bit-serial data COEFA is presented to one of the inputs of the multiplier unit M1 and is multiplied with the data COEFB present at the other input passed from a 16 bit coefficient register COEFREG. The result including any errors detected by a positive or negative overflow detector ER2 is passed to an error handler block ERH. This means that when the result (whether negative or positive is too large in magnitude to be represented by the data packet size error flags are set. The output of the error handler block ERH is transferred to a result register RESULTREG by parallel transfer. This result is then shifted out through the serial output #MOUT. The error handler block ERH also receives error flags (negative overflow AU and positive overflow AO) from the operation of a preceding accumulator cell A at the same time as signal data is loaded by the multiplier cell M. These error flags are passed to it via a 2 bit flag register ER1.

The delay block $Z^{-1}$ comprises a 16 bit delay shift register Z1REG with the same number of stages as bits in the data packet. This provides one data sample period of delay to the signal data passing through it. The delay block $Z^{-1}$ also has another purpose: if the multiplier cell M is performing the function A x B on two data streams then while one data stream is input bit serially the other is needed as a single word, the delay block $Z^{-1}$ is used to convert that word to a parallel word. This also aligns the serial data word fixed point format to the coefficient fixed point format. This single word is otherwise provided by the coefficient register COEFREG which is programmed as part of the multiplier cell M configuration.

Using the two functions of the multiplier cell the following operations can be performed:

I. Multiply input data by constant.

II. Multiply two data streams together.

III. Output a constant (set).

IV. Delay input data by one sample period.

All functions can be reset and the delay function (IV) can be performed in parallel with other linked functions.

Figure 13:
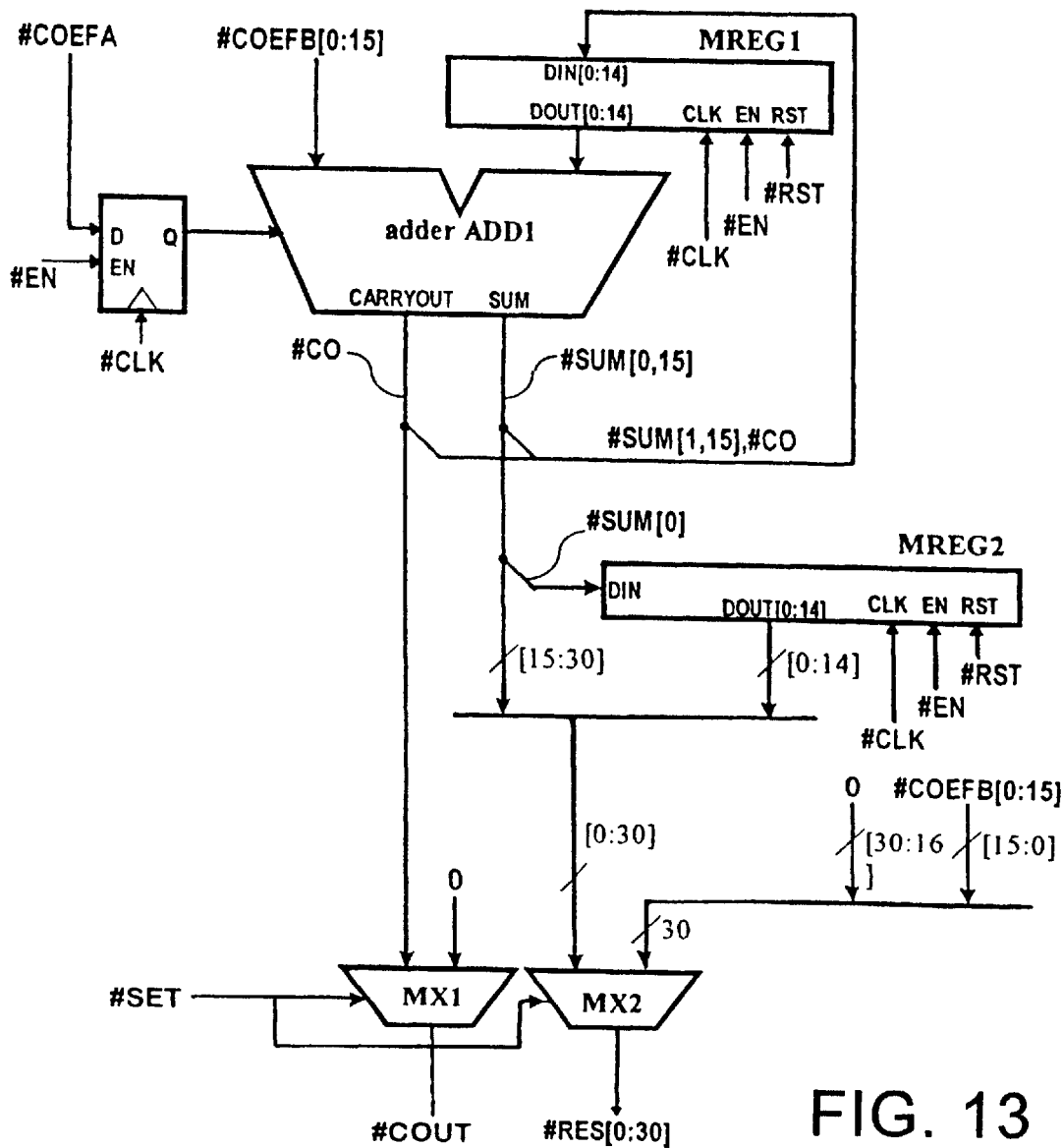
FIG. 13 is a detailed block diagram of a multiplier unit being part of the multiplier processing element.

The multiplier unit M1 is shown in more detail in FIG. 13. This structure is of a standard configuration and comprises a conventional shift and add arrangement. Incoming bit-serial data #COEFA controls an adder ADD1 which provides an add/subtract/no-operation and shift function to an input coefficient #COEFB for each bit in a serial input word. The result is then realigned to the fixed point numerical representation used for all serial data transfers between cells in the array.

Secondary functions of the multiplier, namely reset, enable and output a constant, are controlled by selected inputs from the digital control bus #HD and/or the programming data. Output a constant is supported by using the multiplexers MX1 and MX2 to route the coefficient #COEFB to the output.

Figure 14:
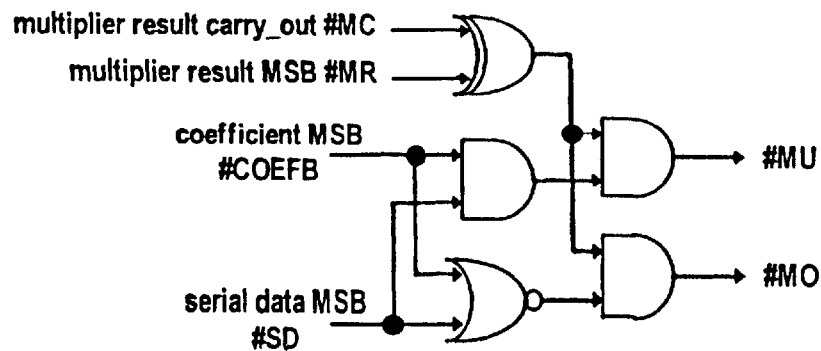
FIG. 14 is a logic diagram of an error flag register forming part of the multiplier processing element of FIG. 12.
Figure 15:
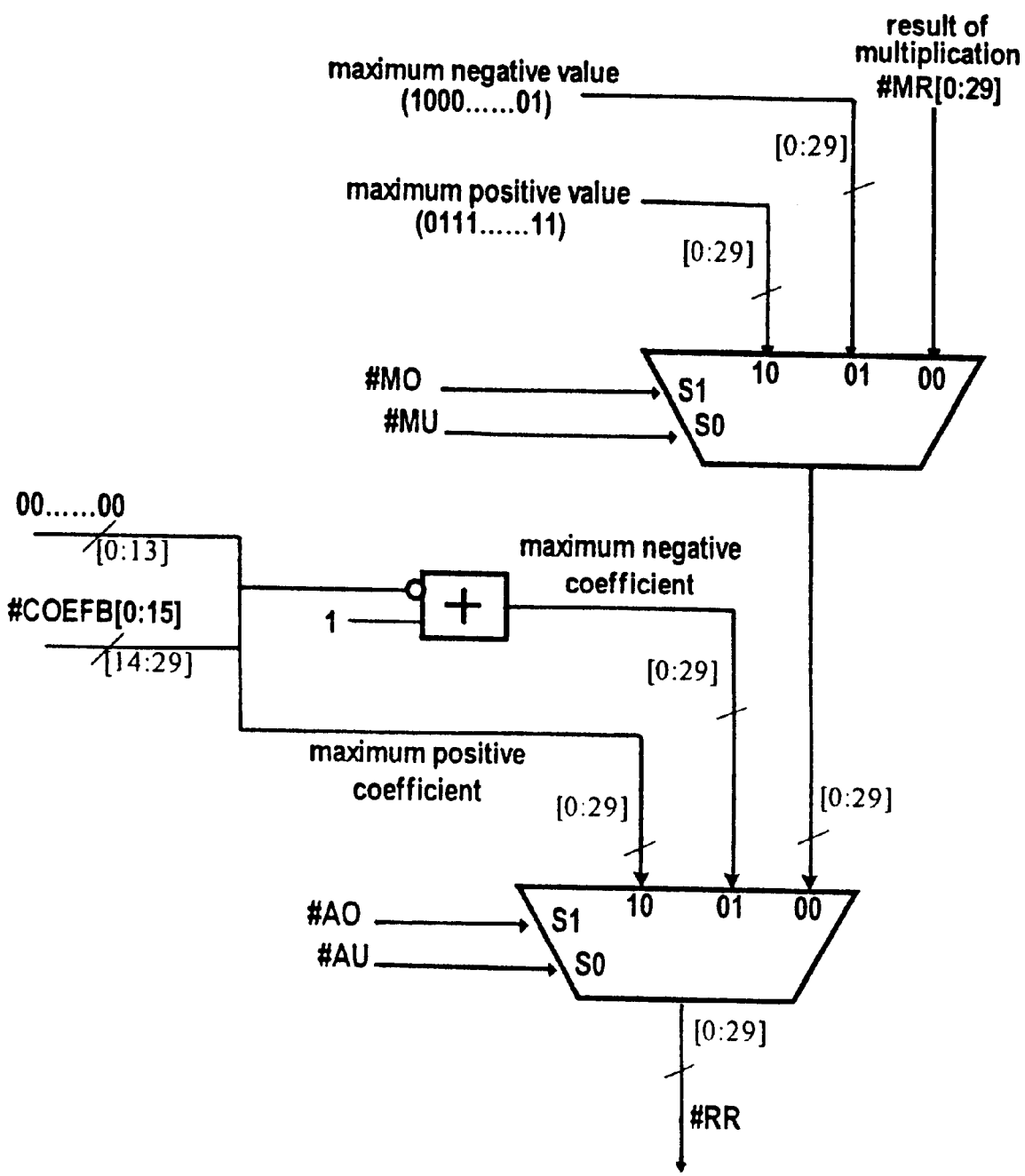
FIG. 15 shows a block diagram of an error handler forming part of the multiplier processing element of FIG. 12.

Errors generated by the multiplier itself are detected in the positive/negative overflow detector ER2, shown in more detail in FIG. 14. The result from the last addition performed in the multiplication process together with the numerical sign of the incoming coefficient and serial data are combined through the simple logic circuit shown. The sign of the coefficient is the MSB of the coefficient, here shown as signal #COEFB. The sign of the input data is the MSB, or the last bit to arrive in the data word, here shown as signal #SD. Together with the carry out #MC and the MSB of the multiplier output #MR these signals are combined to produce outputs indicating a negative overflow #MU or positive overflow #MO condition. Whenever a numerical error has been detected the correct response must be generated. This is the function of the error handler block ERH which is shown in detail in FIG. 15. If a multiply positive or negative overflow #MO, #MU is detected then either the maximum positive or negative value respectively is applied to the output of the error handler ERH; if an accumulator error #AO, #AU is detected from the previous stage then this overrides the multiply error as the value applied to the multiplier was obviously incorrect. If an accumulator positive overflow #AO is detected the output must be corrected to reflect this i.e. a result assuming a maximum value on #COEFA must be calculated. This can be approximated to be the input coefficient #COEFB shifted by the number of number of data bits in the data word for accumulator. Any error resulting from this approximation is small, especially for large data words, and as clipping is occurring anyway will have no effect on the system performance. If an accumulator negative overflow #AU error occurs the output is set to the two's compliment of the positive value.

The output of the error handler is transferred to the result register RESULTREG (see FIG. 12) as a parallel transfer, with the two error flags both reset and appended to the result. This data frame is then shifted out through the serial output #MOUT.

It will be understood that controlling the numerical overflow inherent in fixed point numerical architectures is done by closely emulating the behavior of analogue circuits where signal clipping is well understood. The multiplier cell provides this error correction facility for both errors resulting from calculations in the multiplier cell itself and/or as a result of calculations performed in accumulator cell earlier in the signal path.

Errors occurring in accumulator cells are not corrected there but are indicated to be present by the setting of two flags at the end of the data frame. These two flags are the negative overflow flag and the positive overflow flag. As signal data is being loaded by the multiplier processing element these two flags are passed to the error flag register ER1.

Figure 16:
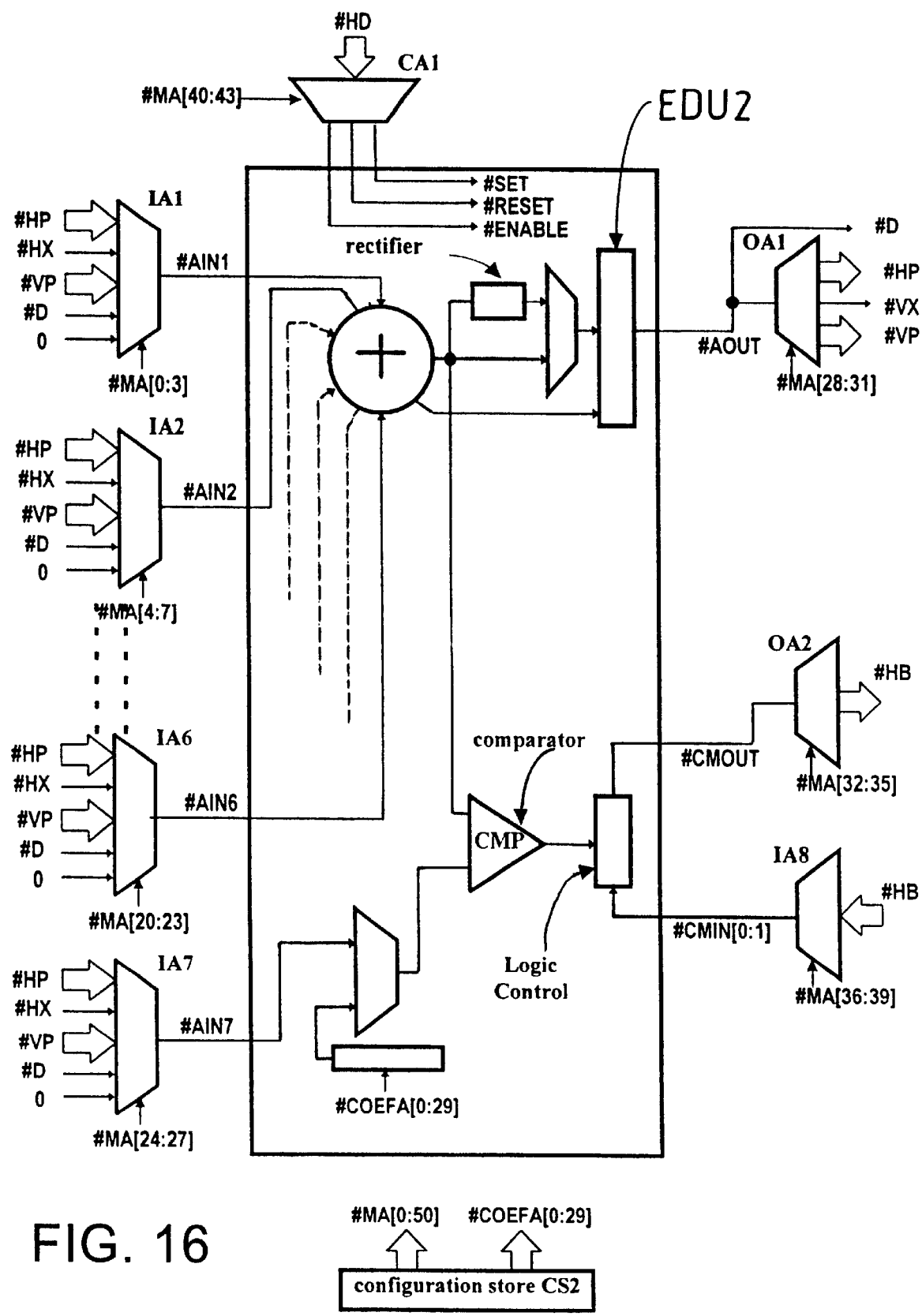
FIG. 16 illustrates a schematic block diagram of an accumulator processing element.

A schematic outline of an accumulator cell is shown in FIG. 16. Data is selectively fed to the cell by input multiplexers IA1–IA8 from the programmable interconnect and direct local connect networks under the control of the configuration store CS2 and processed data is output from the cell via output multiplexers OA1, OA2 which feed the data buses and control buses respectively. The accumulator cell A has an adder unit ACC1 where selected data signals are accumulated and a comparator CMP that may be used to test the value of the result of the accumulation against another value to provide a conditional control signal for use elsewhere in the core array. The cell may also provide non-linear functions such as rectification. In the embodiment shown in FIG. 16 a rectifier RECT is connected to output of the adder unit ACC1. The output of the adder unit ACC1 and the rectifier RECT are both fed to an error detection unit EDU2 to flag any positive or negative overflow errors. Each multiplexer has an input that can select a numerical zero so that an input can be selectively excluded from the adder unit ACC1.

Figure 17:
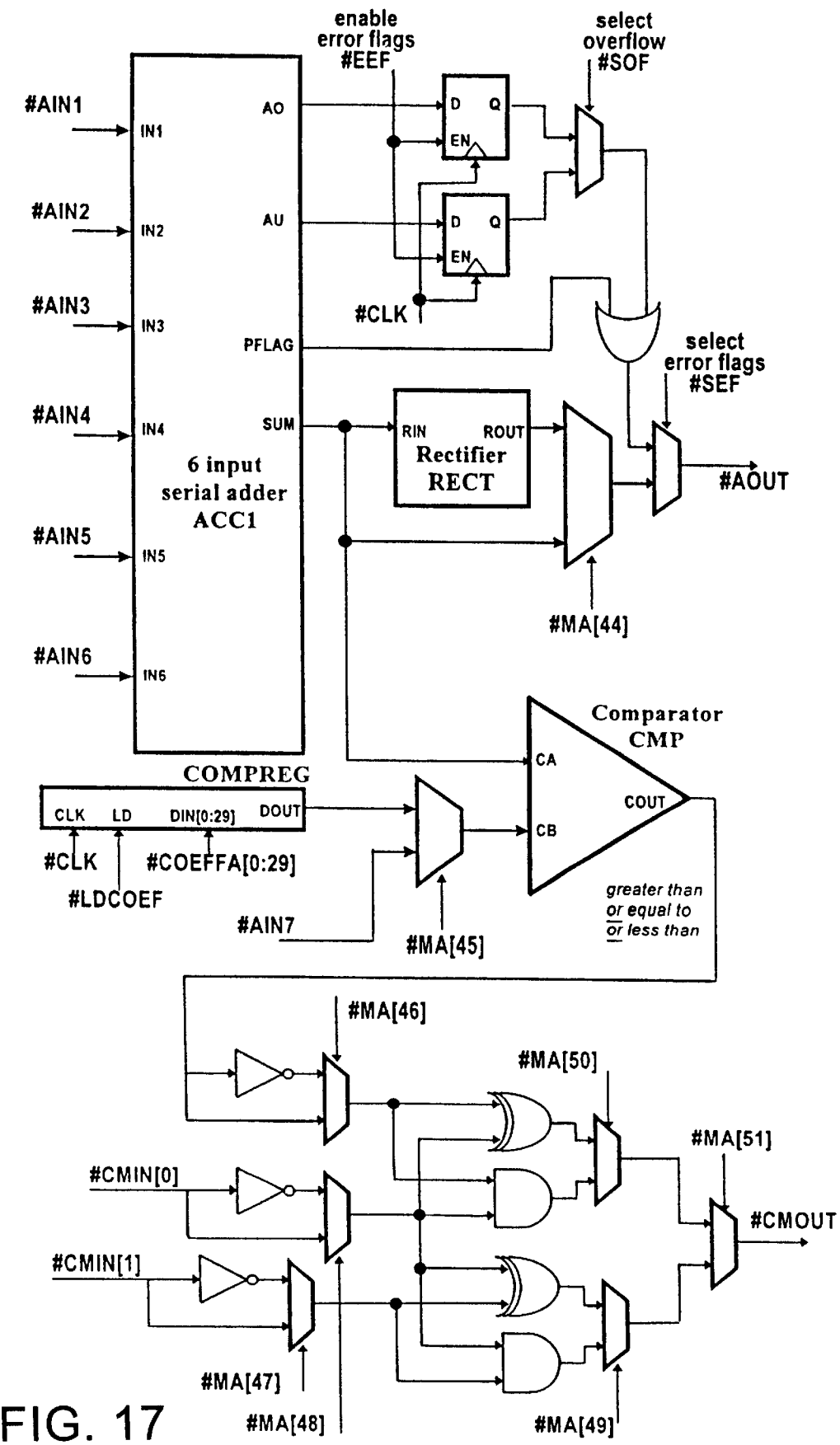
FIG. 17 shows a detailed diagram of the accumulator processing element of FIG. 16.

FIG. 17 shows a more detailed block diagram of the accumulator cell. The data inputs on #AIN7, #AIN8 fed in through multiplexers IA7 and IA8, provide signals for use in the compare control function of the cell. The other inputs on #AIN1-#A1N8 are fed to the adder unit ACC1 and the result of the accumulation is passed to a positive/negative overflow detection block.

During the serial accumulation of the inputs the overflow detection is carried out in the adder unit (a serial adder) and at the end of the computation the positive and negative overflow flags #AO, #AU are appended to the data packet before the data passes out of the cell on #AOUT.

The sum of the accumulation may be passed to the error detection block via a rectifier block RECT, where the result of the accumulation may be rectified before being output.

The output of the adder unit ACC1 may also be passed to a comparator block CMP, where it is compared with a constant #COEFFA held in the register COMPREG or with an alternative signal source #AIN7. The result of the comparison (programmable as either less than, greater than or equal to) may be combined with an external signal #CMIN with control logic to generate control signals for other processing cells in the array. The resultant combined signal is fed onto the control bus through the output multiplexer OA2.

Figure 18:
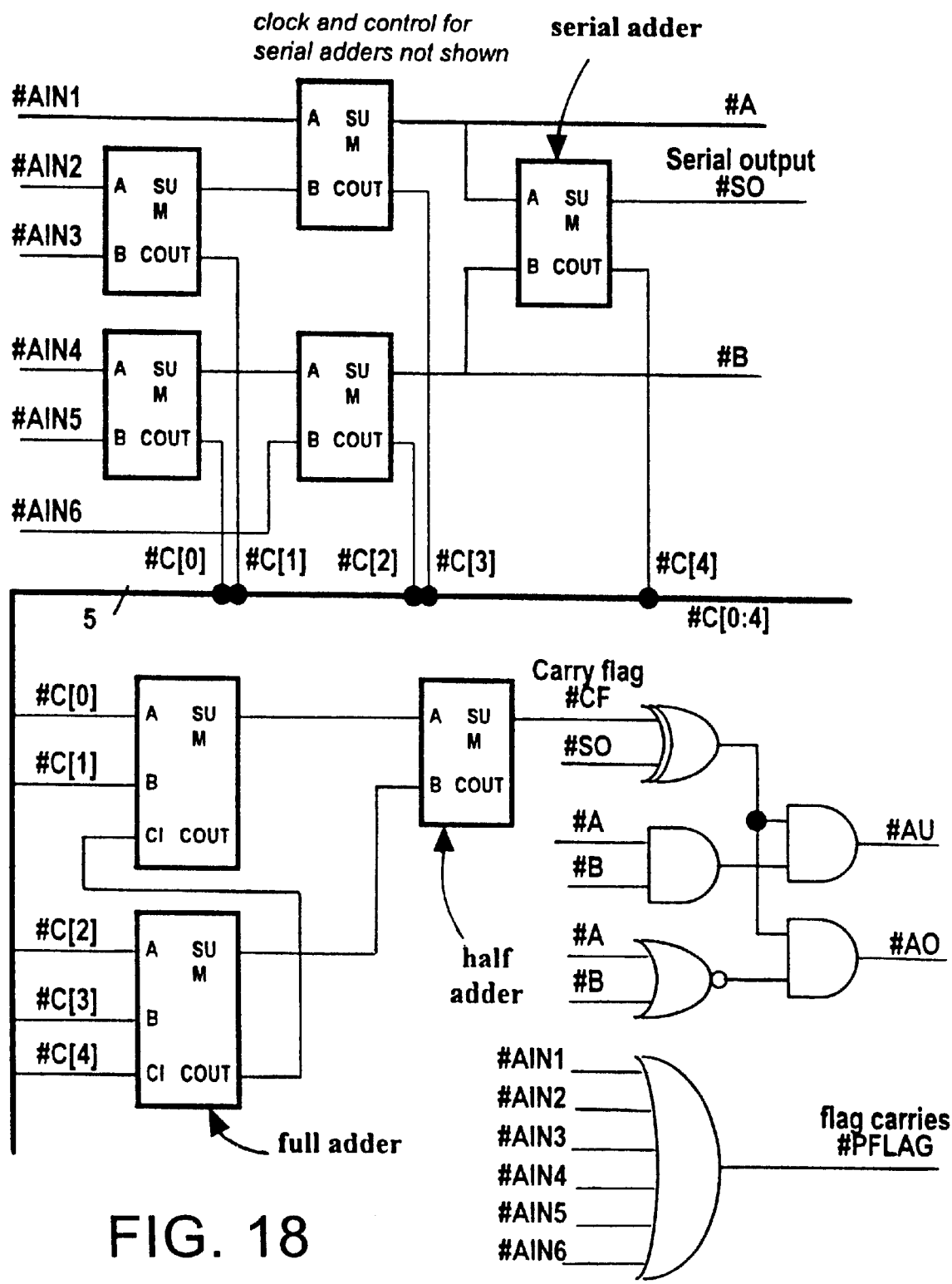
FIG. 18 shows a logic diagram of an adder unit forming part of the accumulator processing element of FIGS. 16 and 17.
Figure 19:
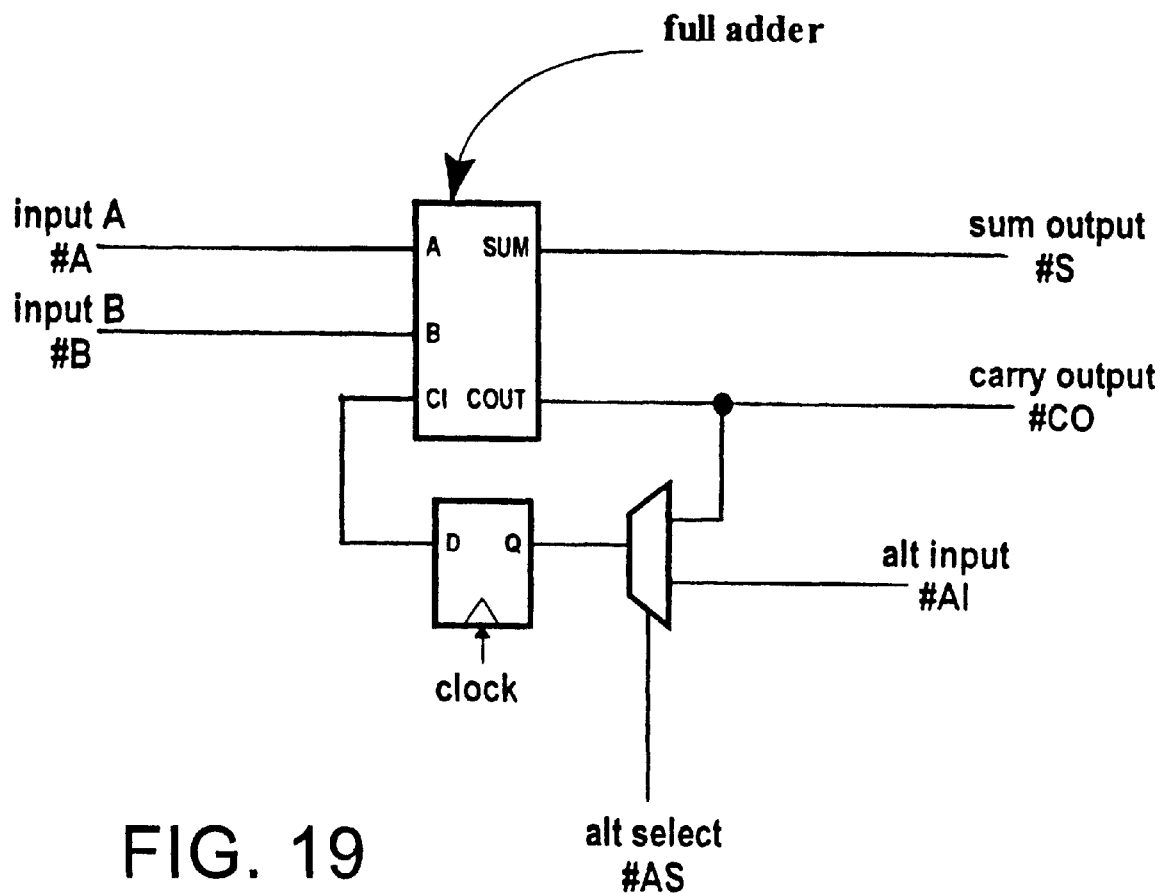
FIG. 19 shows a serial adder that forms part of the adder unit of FIG. 18.

The adder unit, shown in detail in FIG. 18 with six input signals #AIN1-#AIN6 is constructed from a plurality of two input serial adders, one of which is shown in FIG. 19. The bit serial inputs (A and B in FIG. 19) are added to give a bit serial sum #S. This adder structure can be set or reset synchronously using an alt_select control signal #AS to select an alt_input signal #AI. The value of the alt_input signal determines whether the adder is set or reset.

Figure 24:
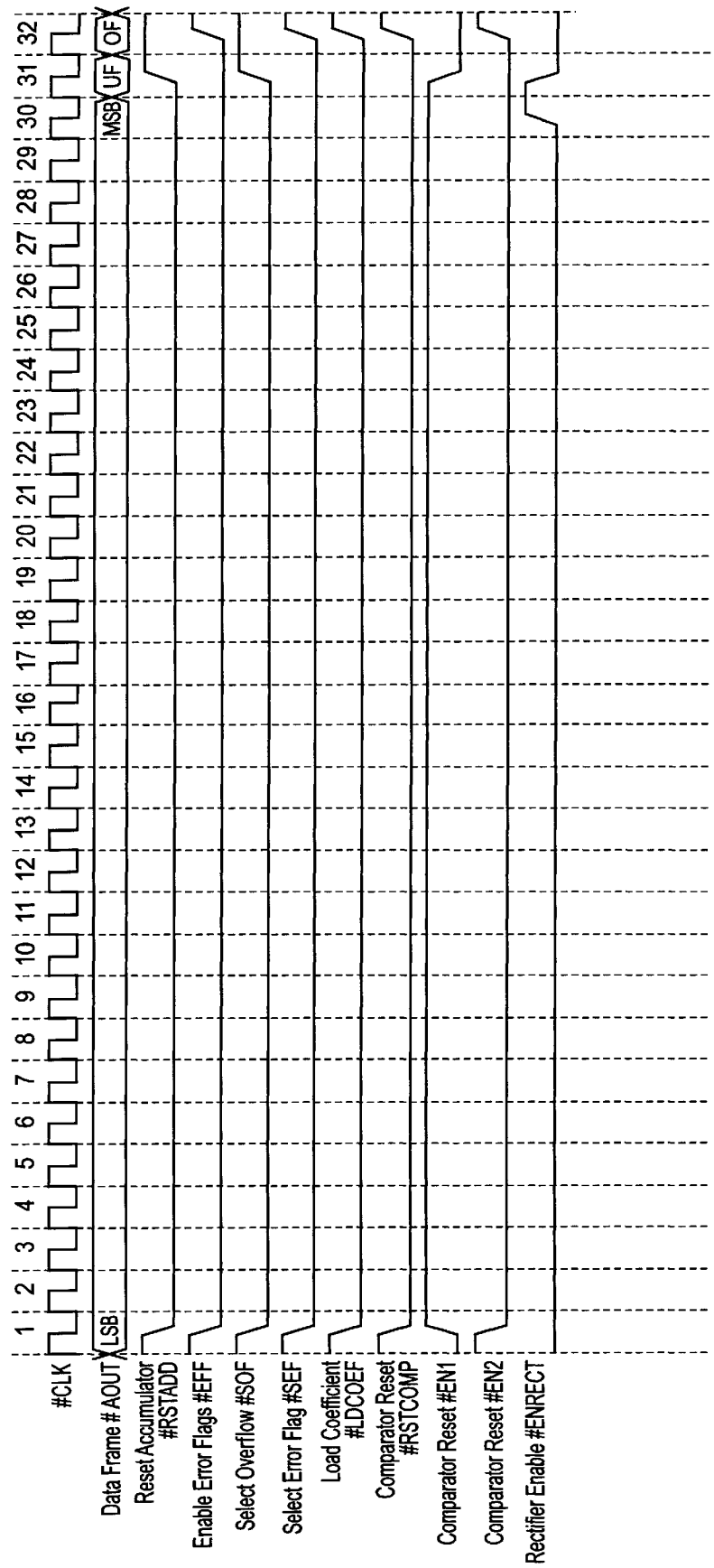
FIG. 24 shows a timing diagram for the accumulator processing element of FIGS. 16 and 17.

The MSB of the adder unit serial output is combined with the MSB's of the final accumulation in the accumulator process (#A & #B) and with the carry flag #CF to generate the error flags. The negative and positive overflow flags AU, AO are appended onto the output data word via multiplexer OA1 to form the data packet. The timing of this circuit and the format of the data packet are shown in FIG. 24.

Figure 20:
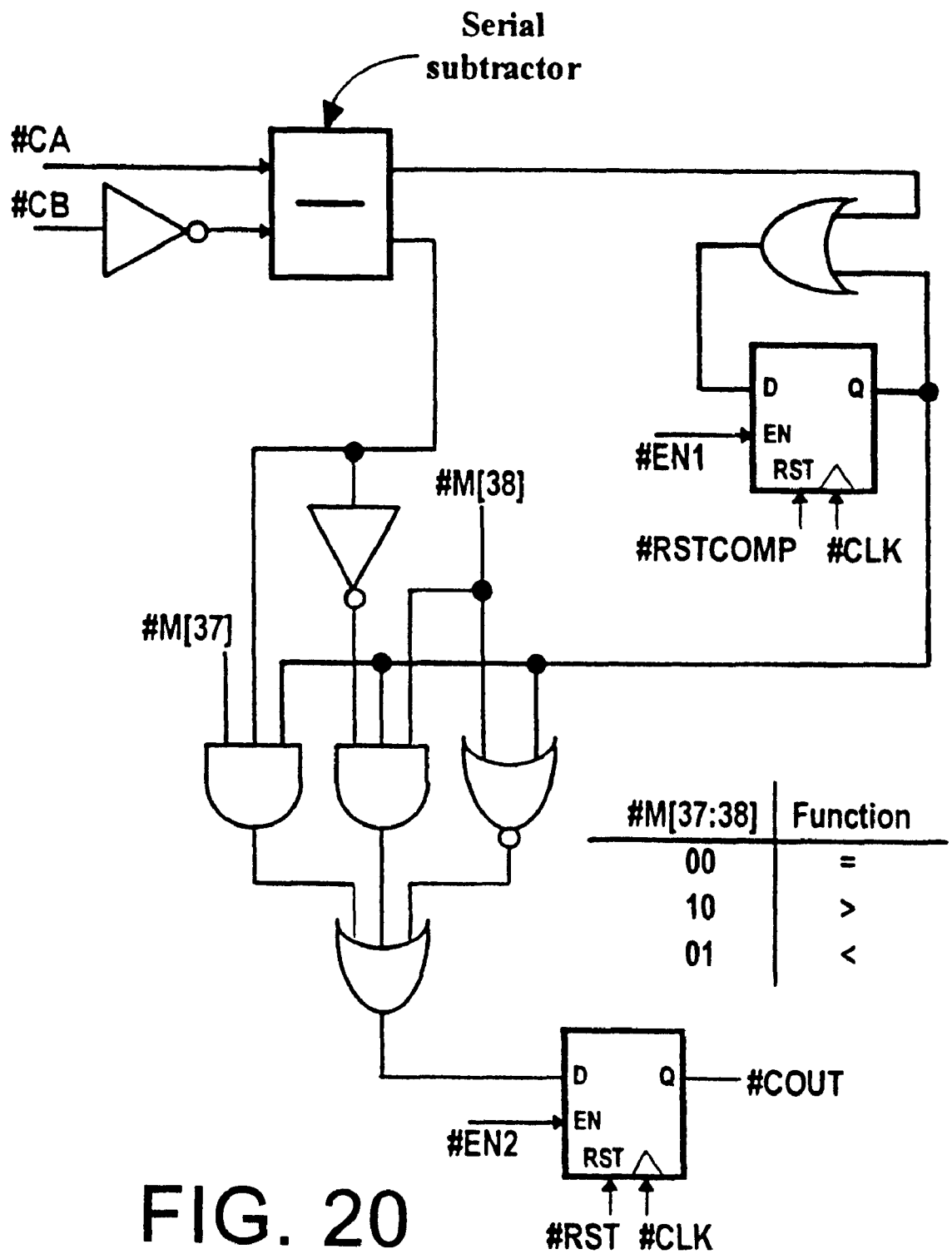
FIG. 20 shows a logic circuit diagram of a comparator forming part of the accumulator processing element of FIGS. 16 and 17.

The comparator block CMP logic circuit is shown in detail in FIG. 20 and is of known design. The inputs #CA, #CB are connected to the output data of the adder unit and to the output of a multiplexer MA and are passed to a bit serial adder with one inverted input and with a flip-flop pre-set to one to perform subtraction. The multiplier MA allows selection of the input #CB from either a constant COEFFA provided by the comparator register COMPREG or an alternative input signal #AIN7. The constant COEFFA is set during programming but is constantly circulated round the register COMPREG during operation continuously outputting a serial value. Under the control of signals #M[37] and #M[38], defined by the configuration store, the comparator can perform either greater-than, less-than or equal-to comparison. The generation of the timing sequence for the comparator is shown in detail in 24.

Figure 21:
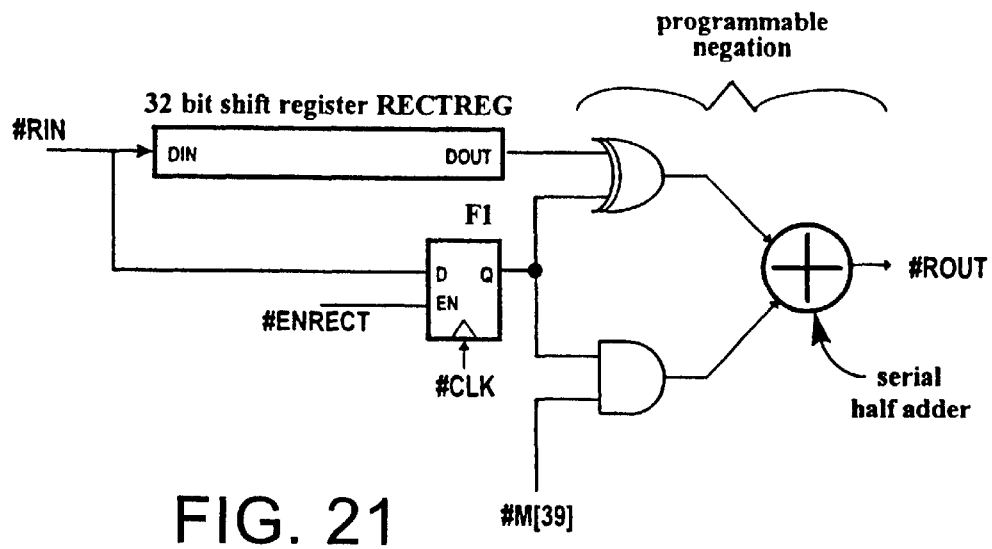
FIG. 21 shows a schematic diagram of a rectifier forming part of the accumulator processing element of FIGS. 16 and 17.

The rectifier block RECT is shown in detail in FIG. 21. The output of the adder unit is fed into a shift register RECTREG to delay the data packet by one sample period. A flip-flop F1 captures the sign bit of the incoming word. The sign bit, the delayed word and a control signal #M[39] are fed through a known logic circuit including a serial half adder to negate the delayed word ensuring the serial output #ROUT is the same magnitude of the incoming serial word but always positive in sign.

The accumulator processing cell provides a number of functions such that the processor architecture can support a diverse range of operation. The accumulator functions are
I Accumulate up to six signals.
II. Compare signals or a signal and constant for >, <, =.
III. Rectify the output of the accumulator.
IV. Generate control data for multiplier processing cells based on the comparison, external control signals and other accumulator processing cell generated control signals.

Figure 22:
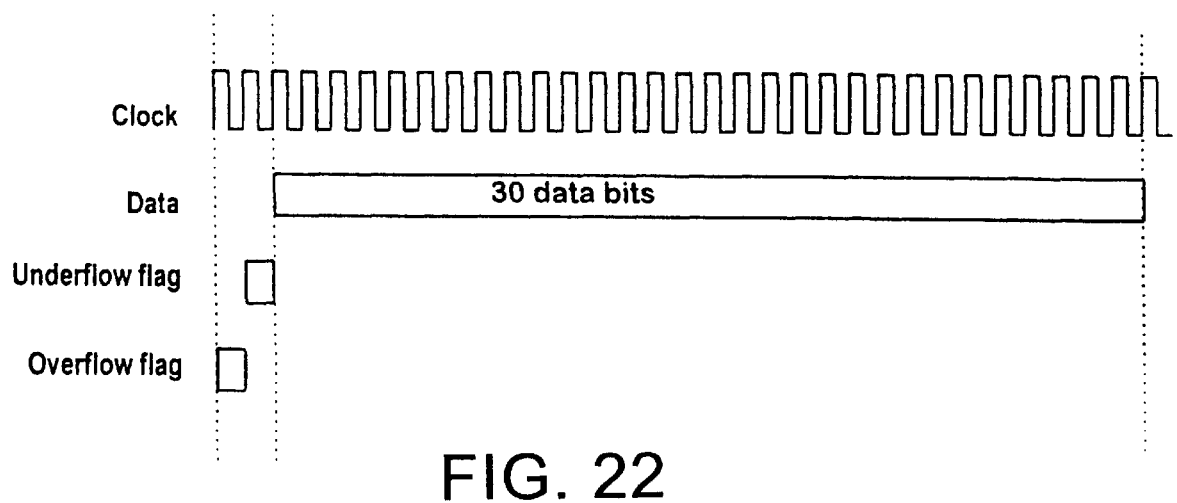
FIG. 22 illustrates the content of a packet of data of the present invention.

The processor array operates on bit-serial data that is transmitted between the cells synchronously. The data word length defines the precision of the mathematical operations. In this example a 30 bit data word is used. The information passed between the cells of the array is called a signal data packet. This is the data word with two control bits concatenated. The control bits are transmitted at the end of the data word and are used as flags to transmit the positive or negative overflow condition resulting from a mathematical operation. This data can be used in succeeding cells to allow the data to be controlled or corrected. The structure of a data packet. A data packet is shown in FIG. 22. The LSB of the data word is transmitted first, with the error flags following the MSB.

The core array is a fixed point processing array. The position of the decimal point in such a scheme is not important provided it is consistent across all the cells. In this specific embodiment the processor uses a 32 bit data frame with 30 bits of numeric precision. The coefficients used by the multiplier cells have a word width of sixteen bits.

All data transfer between cells occurs over one sample period otherwise called a data packet. If the transfer is carried out bit-serially it is carried out over N clocks, where N is the number of bits in the system data word. For this implementation the data word is 32 bits, 30 data and two control. Data is transmitted least significant bit (LSB) first with the last two bits of the frame being the positive and negative overflow flags. This method of transmission means that the lower bits can be transferred to the next cell whilst the higher order bits are being calculated. The problem normally associated with this method is that positive and negative overflow is not detected until the end of the calculation when the result has already been processed by the following cell. However, the present arrangement overcomes this problem.

Figure 23:
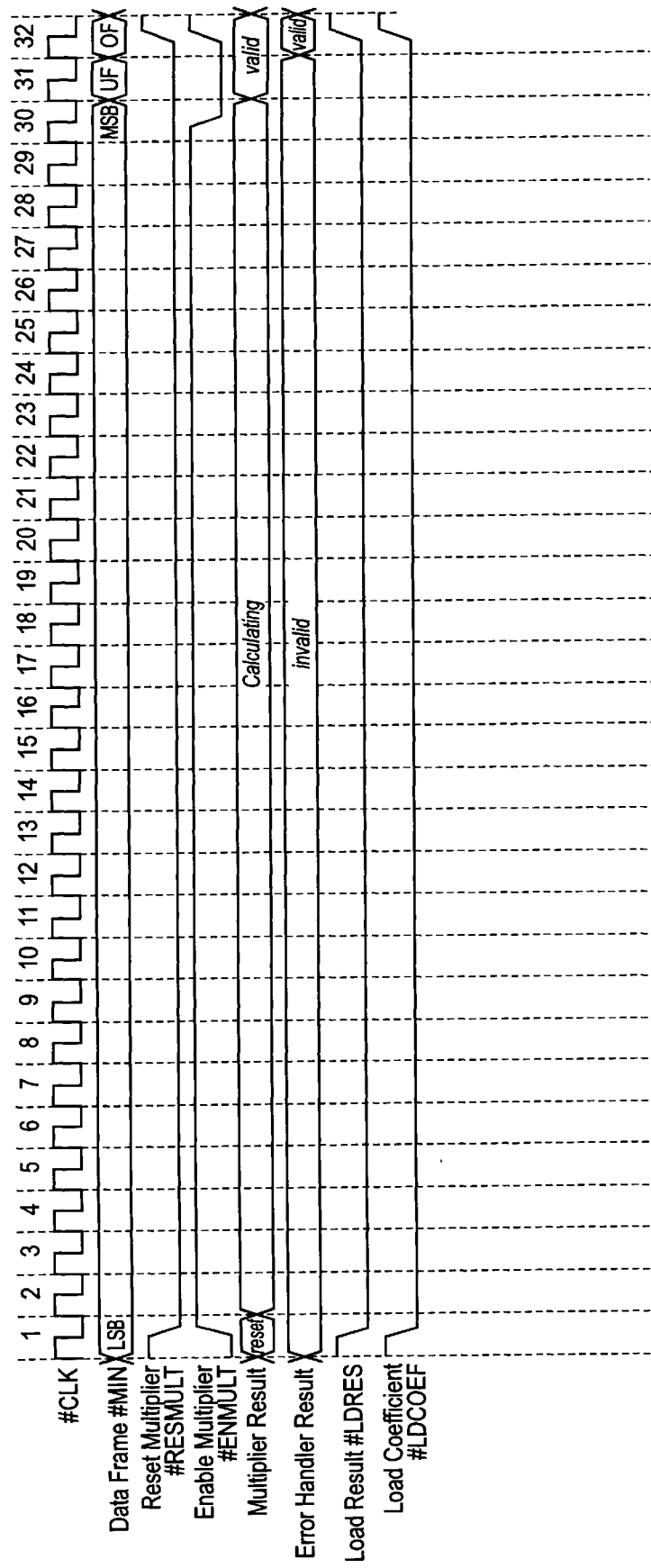
FIG. 23 shows a timing diagram for the multiplier processing element of FIGS. 11 and 12.

All data transfer within the array is synchronised to the data frame and examples of data transfer in the multiplier and accumulator cells are shown respectively in FIGS. 23 and 24. All control signals are derived from the primary clock.

From FIG. 23 it can be seen that the signal #LDRES initiates the synchronous transfer of data between the error handler block ERH and the multiplier result register. The significance of this signal is that it ensures all the error correction methods will have been completed and synchronises the output of the multiplier processing element to the data sample period.

Figure 25:
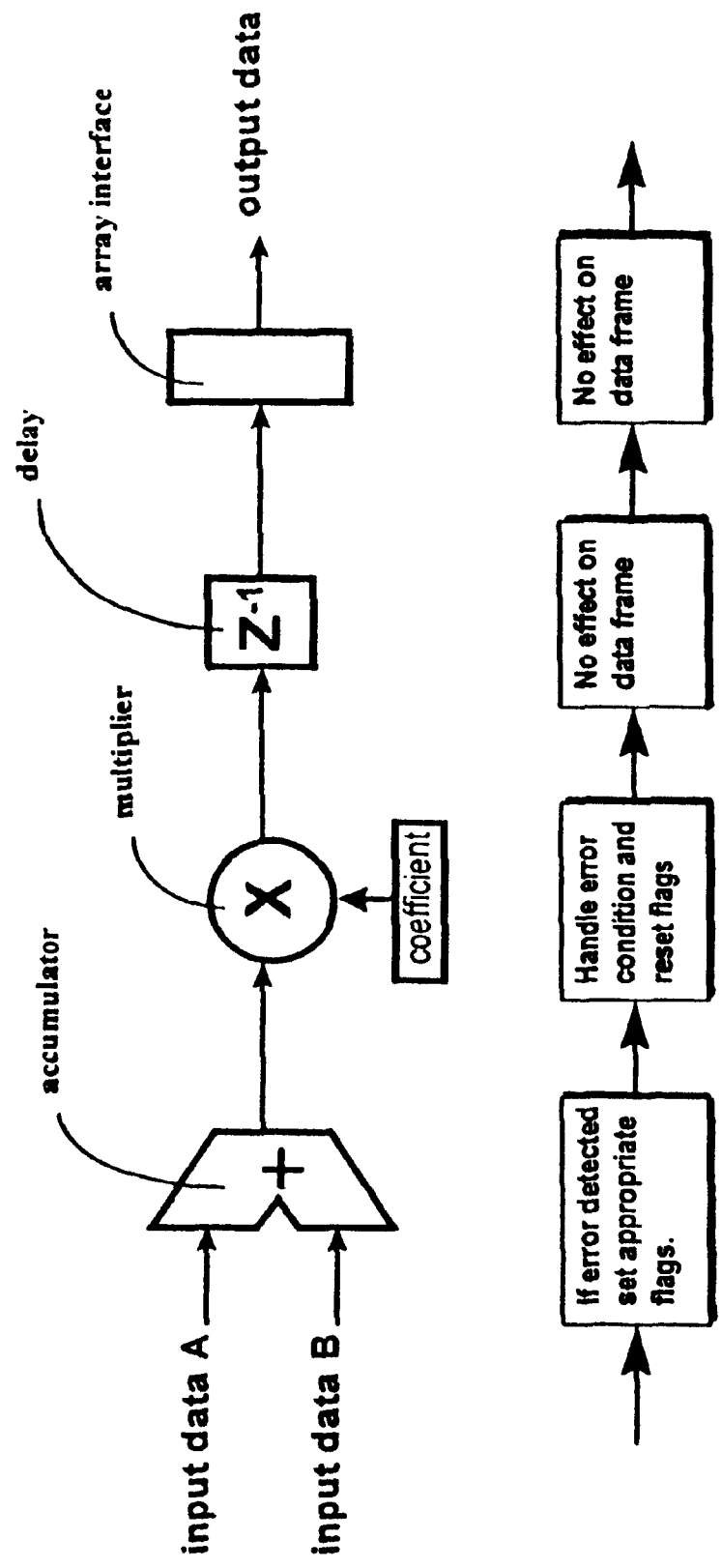
FIGS. 25 to 27 illustrate examples of error handling techniques.
Figure 26:
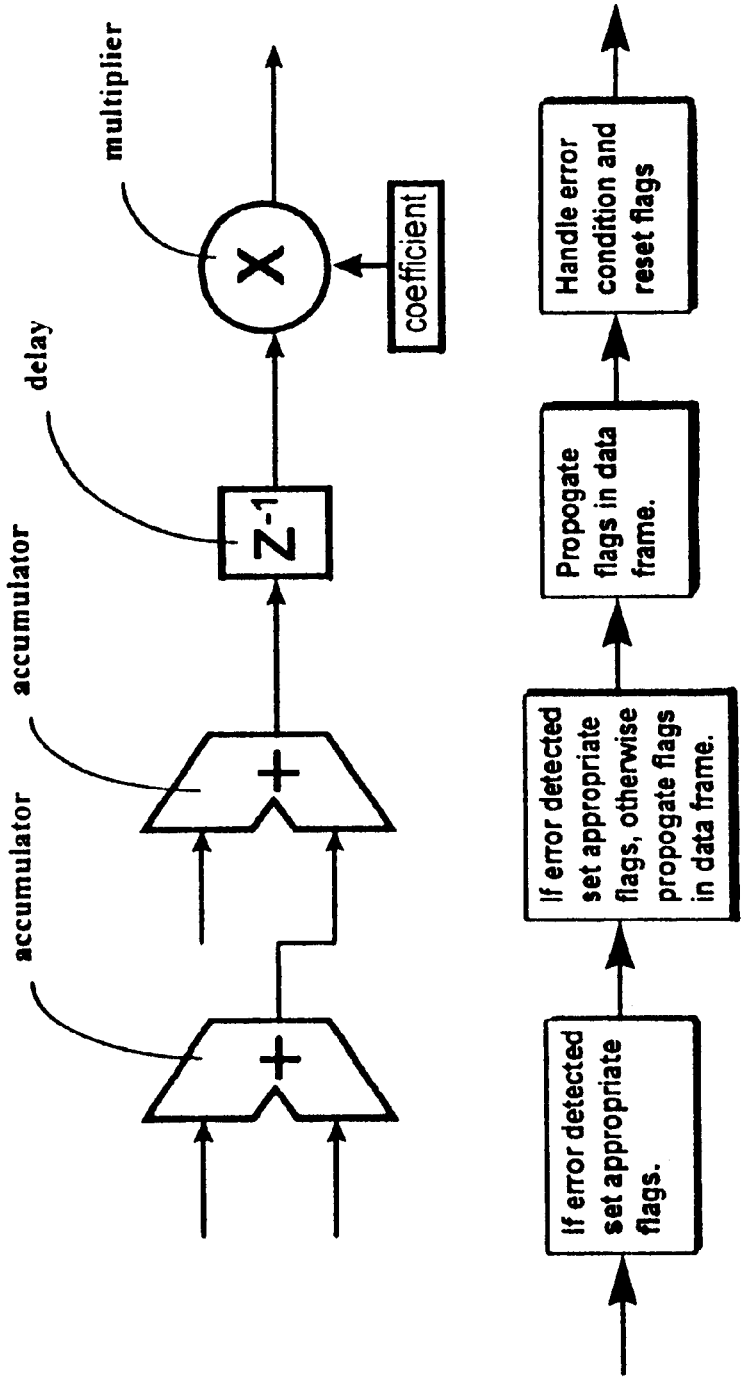
Figure 27:
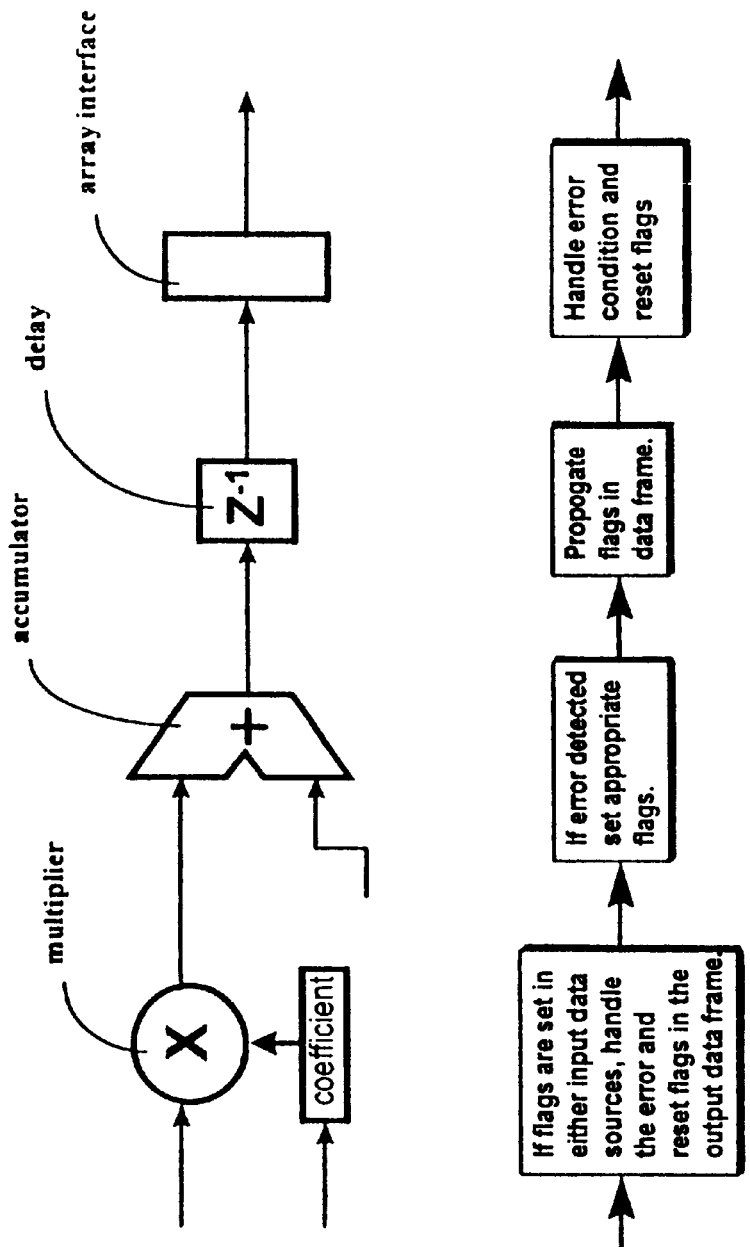

Examples of error handling techniques for different sequences of arithmetic operation are shown in FIGS. 25 to 27. In the first example shown in FIG. 25 two data packets are first processed by an accumulator cell and the result is then multiplied with a constant in a multiplier cell. The output data of the multiplier is then delayed and output from the core array via the array interface. If an error occurs is the accumulator cell the appropriate error flags in the data packet are set and when the multiplier cell receives the data packet the error flags are loaded into the error flag register ER and handled in the appropriate manner. The delay unit and the array interface do not affect the content of the data packet.

In FIG. 26 data is processed successively by two accumulator cells before being delayed and then processed by a multiplier cell. If an error is detected in the first accumulator the appropriate flags are set and are transmitted to the second accumulator cell in the data packet output. If the second accumulator cell processing results in an error the appropriate flags are set otherwise the error flags form the previous operation are propagated through to the output data packet. When the data reaches the multiplier the error is handled in the appropriate manner and the flags are reset.

In the arrangement shown in FIG. 27 two data packets are multiplied together and the result is then added with separate data stream in the accumulator cell. The resulting output data packet is delayed before being transmitted out of the core array via the array interface. If data flags are set in either input data packet the multiplier will handle the error(s) and reset the flags in the output data packet passed to the accumulator. If the operation of the accumulator results in an error the appropriate error flags are set and these are propagated through as part of the output data packet to the array interface where the error condition is handled and the error flags are reset.

What is claimed is:

1. A field programmable processor comprising:
   a regular array of processing elements, each of which performs a function on packets of data the packets of data containing at least one control flag,
   an array of signal conductors extending adjacent the processing elements,
   switching means for selectively connecting the processing elements to the adjacent signal conductors so as to interconnect the processing elements,
   means for storing program data representing desired processing element interconnections,
   means for controlling the switching means in accordance with the stored program data to achieve the desired processing element interconnection,
   means for storing numeric data values within each processing element, and
   means for synchronously transmitting packets of data between the interconnected processing elements,
   the interconnections between processing elements being and remaining fixed once the processor has been programmed and the processing elements being dedicated fixed arithmetic function processing elements that are connected directly to each other, and
   wherein the packets of data are transmitted between the processing elements in serial form, and the at least one control flag serves to indicate whether there is an incompleteness of processing of information transmitted within the data packet, each subsequent processing element having means for detecting the status of a received control flag and means for completing the processing of the information transmitted to it within the data packet on the basis of the detected status of the control flag.

2. A processor as in claim 1, further comprising:
   a further array of signal conductors extending adjacent the processing elements, the further array being arranged to convey function control data between the processing elements.

3. A processor as in claim 2, wherein the function control data is generated by a processing element or a combination of processing elements.

4. A processor as in claim 2, wherein the function controlled by the function control data is any one of reset, set, enable or modification of the signal data.

5. A processor as in claim 1, wherein the function of each processing element is either multiply or add.

6. A processor as in claim 5, wherein at least one processing element having the multiply function uses a synchronous shift and add operation.

7. A processor as in claim 1, wherein the processing elements are arranged in an array of identical groups of elements, each group incorporating processing elements of different functions.

8. A processor as in claim 7, wherein each identical group comprises one processing element with the add function and three processing elements having the multiply function.

9. A processor as in claim 1, wherein a processing element has delay means so that data on an output of the processing element is a copy of the input data delayed by the time it takes to transmit a complete packet of data.

10. A processor as in claim 2 further comprising:
    means to transmit control data between the further array of signal conductors and an external control data source or destination.

11. A processor as in claim 1, wherein means are provided for converting the stored numeric data value into serial format so that it may be used in the processing element.

12. A processor as in claim 1, wherein:
    the processing elements perform arithmetic operations using fixed point processes, and
    the incompleteness indicated by the control flag is positive and/or negative overflow.

13. A processor as in claim 1 further comprising:
    multiplier processing elements which incorporate means for handling locally generated errors indicating the incompleteness of the processing of information.

14. A processor as in claim 1 further comprising:
    analogue to digital and digital to analogue converters connected to the signal conductors to enable digital conversions of input analogue signals to be delivered to the processing elements and to enable the output of analogue conventions of digital signals produced by the processing elements.

15. A field programmable processor as in claim 2, further comprising:
    at least one logic cell, which operates on said function control data,
    further switching means for selectively connecting said at least one logic cell to the further array of signal conductors.

16. A method comprising:
    providing a regular array of processing elements in a field programmable processor, each of the processing elements performing a function on packets of data, said packets of data containing at least one control flag, and an array of signal conductors in the field programmable processor extending adjacent the processing elements;
    selectively connecting the processing elements to the adjacent signal conductors so as to interconnect the processing elements;
    storing program data representing desired processing element interconnections;
    controlling the selective connecting in accordance with the stored program data to achieve the desired processing element interconnection;
    storing numeric data values within each processing element; and
    synchronously transmitting packets of data between the interconnected processing elements;
    the interconnections between processing elements being and remaining fixed once the processor has been programmed and the processing elements being dedicated fixed arithmetic function processing element that are connected directly to each other,
    and
    wherein the packets of data are transmitted between processing elements in serial form, and the at least one control flag serves to indicate whether there is an incompleteness of processing of information transmitted within the data packet, each subsequent processing element detecting the status of a received control flag and completing the processing of the information transmitted to it within the data packet on the basis of the detected status of the control flag.

17. A method as claimed in claim 16, further comprising selectively connecting at least one logic cell, the cell operating on the function control data, to the further array of signal conductors.

18. A method as in claim 1, wherein:

the processing elements perform arithmetic operations using fixed point processes, and the incompleteness indicated by the control flag is positive and/or negative overflow.

19. A method as in claim 1 further comprising handling locally generated errors indicating the incompleteness of the processing of information.

* * * * *